United States Patent
Sato et al.

(10) Patent No.: US 12,238,689 B2
(45) Date of Patent: Feb. 25, 2025

(54) RECEPTION DEVICE AND METHOD, AND TRANSMISSION DEVICE AND METHOD

(71) Applicant: SONY GROUP CORPORATION, Tokyo (JP)

(72) Inventors: Masanori Sato, Tokyo (JP); Sawako Kiriyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 564 days.

(21) Appl. No.: 17/420,052

(22) PCT Filed: Dec. 25, 2019

(86) PCT No.: PCT/JP2019/050768
§ 371 (c)(1),
(2) Date: Jun. 30, 2021

(87) PCT Pub. No.: WO2020/145141
PCT Pub. Date: Jul. 16, 2020

(65) Prior Publication Data
US 2022/0095290 A1 Mar. 24, 2022

(30) Foreign Application Priority Data
Jan. 8, 2019 (JP) ................. 2019-000940

(51) Int. Cl.
*H04W 72/04* (2023.01)
*H04W 4/38* (2018.01)
(Continued)

(52) U.S. Cl.
CPC ........... *H04W 72/044* (2013.01); *H04W 4/38* (2018.02); *H04W 72/20* (2023.01); *H04W 84/18* (2013.01)

(58) Field of Classification Search
CPC ..... H04W 4/38; H04W 72/044; H04W 72/20; H04W 4/023; H04W 4/70; H04W 56/00;
(Continued)

(56) References Cited

U.S. PATENT DOCUMENTS

2018/0191398 A1 7/2018 Kobayashi et al.
2020/0099734 A1* 3/2020 Sun ..................... H04L 12/2874
(Continued)

FOREIGN PATENT DOCUMENTS

CN 107852190 A 3/2018
EP 3471279 A1 4/2019
(Continued)

OTHER PUBLICATIONS

International Search Report and Written Opinion of PCT Application No. PCT/JP2019/050768, issued on Mar. 24, 2020, 08 pages of ISRWO.

*Primary Examiner* — Robert J Lopata
(74) *Attorney, Agent, or Firm* — CHIP LAW GROUP

(57) ABSTRACT

The present technology relates to a reception device and method and a transmission device and method that enable provision of a low power consumption wireless communication system that can be used regardless of location. A terminal on a transmission side transmits a control frame containing transmission-related information regarding a transmission time and a transmission frequency that are determined on the basis of an internal time and a terminal ID on a transmission side. Then, after transmitting the control frame, the terminal on the transmission side transmits a data frame containing predetermined data in accordance with the transmission time and the transmission frequency. The present technology can be applied to wireless communication systems.

16 Claims, 26 Drawing Sheets

(51) Int. Cl.
*H04W 72/044* (2023.01)
*H04W 72/20* (2023.01)
*H04W 84/18* (2009.01)

(58) Field of Classification Search
CPC . H04W 72/02; H04W 72/0453; H04W 84/18; Y02D 30/70
USPC ............................................. 370/329
See application file for complete search history.

(56) References Cited

U.S. PATENT DOCUMENTS

2022/0078775 A1* 3/2022 Kiriyama .............. H04W 4/023
2022/0224576 A1* 7/2022 Kiriyama .............. H04L 27/103

FOREIGN PATENT DOCUMENTS

| JP | 2012-054799 A | 3/2012 |
| WO | 2017/212810 A1 | 12/2017 |
| WO | 2018/047432 A1 | 3/2018 |

* cited by examiner

FIG. 4

| WIRELESS RESOURCE OF CONTROL FRAME | | | |
|---|---|---|---|
| TRANSMISSION TIME | TRANSMISSION FREQUENCY | SCRAMBLE CODE | SYNC CODE |
| ANY TIME + α | ANY FREQUENCY | INITIAL VALUE: COMMON VALUE OF SYSTEM | INITIAL VALUE: COMMON VALUE OF SYSTEM |

FIG. 7

| WIRELESS RESOURCE OF DATA FRAME | | SCRAMBLE CODE | SYNC CODE |
|---|---|---|---|
| TRANSMISSION TIME | TRANSMISSION FREQUENCY | | |
| DETERMINED BY USING INTERNAL TIME AND TERMINAL ID | DETERMINED BY USING INTERNAL TIME AND TERMINAL ID | INITIAL VALUE: TERMINAL ID | INITIAL VALUE: TERMINAL ID AND COMMON VALUE OF SYSTEM |

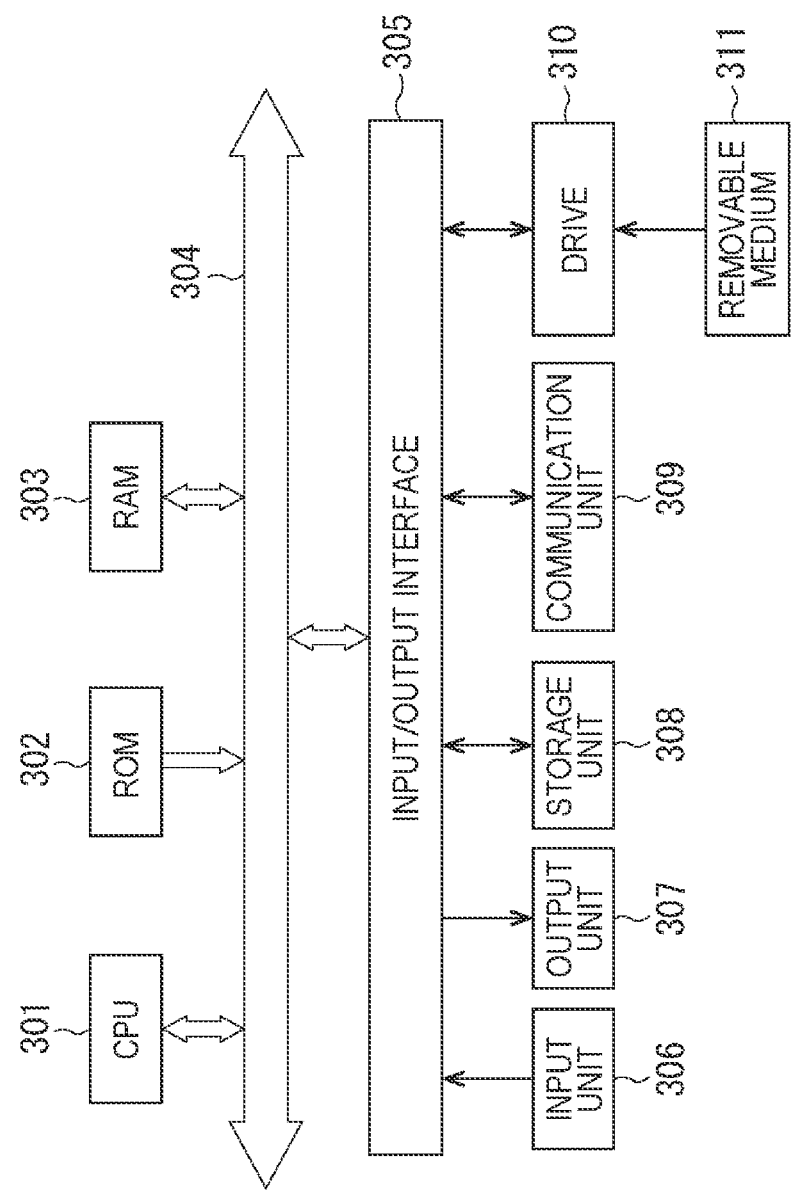

RECEPTION DEVICE AND METHOD, AND TRANSMISSION DEVICE AND METHOD

CROSS REFERENCE TO RELATED APPLICATIONS

This application is a U.S. National Phase of International Patent Application No. PCT/JP2019/050768 filed Dec. 25, 2019, which claims priority benefit of Japanese Patent Application No. JP 2019-000940 filed in the Japan Patent Office on Jan. 8, 2019. Each of the above-referenced applications is hereby incorporated herein by reference in its entirety.

TECHNICAL FIELD

The present technology relates to a reception device and method and a transmission device and method, and particularly relates to a reception device and method and a transmission device and method that enable provision of a low power consumption wireless communication system that can be used regardless of location.

BACKGROUND ART

In recent years, expectations are rising for a field called Internet of things (IoT), which seeks to build an efficient social system by acquiring and analyzing sensor data from various places and objects. At that time, in IoT, it is considered to use wireless communication as a means to acquire sensor data.

Wireless communication used in IoT has requirements different from conventional communications. First, a terminal that acquires sensor data operates on a battery because it cannot be expected to secure a power source. The terminal is expected to be miniaturized and to operate for a long time, and low power consumption is indispensable.

Next, in order to acquire all kinds of information, the number of terminals increases, and a usage cost of using a wireless communication system including the terminals increases. Therefore, it is required to reduce a cost of the entire wireless communication system.

Finally, in order to acquire data from various places and objects, it is essential that the number of connected terminals per receiving station that receives data is large.

In order to meet the requirements described above, there has been proposed a wireless communication system that assigns a transmission time, a transmission frequency, and a code, which are wireless resources used for transmission, by receiving a GPS signal including time information to obtain time information in the entire wireless communication system (see Patent Document 1).

Each terminal uses the time information obtained from the GPS signal and its own ID to determine a wireless resource on the basis of a predetermined rule. As a result, the terminal can perform transmission without necessity of receiving a signal from the receiving station, and a standby time required to receive the signal from the receiving station is no longer required, which makes it possible to realize low power consumption.

Whereas, the receiving station can also grasp the wireless resource by calculating the wireless resource in accordance with the same rule by using the time information obtained from the GPS signal and the ID of the terminal, which enables efficient use of wireless resources. As a result, the receiving station can perform reception processing of many terminals at a low cost.

CITATION LIST

Patent Document

Patent Document 1: International Publication No. 2017/212810

SUMMARY OF THE INVENTION

Problems to be Solved by the Invention

As one of the uses of IoT, it is assumed that a terminal on a transmission side is used indoors or underground. For example, the terminal on the transmission side is installed and used indoors in a case of equipment monitoring in a factory. Furthermore, the terminal on the transmission side is installed and used underground in a case of monitoring a soil environment in agriculture. In these cases, it may be difficult for the terminal on the transmission side to receive GPS signals.

In a case where it is difficult to receive GPS signals, it is not possible to receive GPS signals and accordingly obtain time information contained in GPS signals. Then, it becomes difficult for the terminal on the transmission side to determine a transmission time, a transmission frequency, and a code, with which transmission is performed to the receiving station.

The present technology has been made in view of such a situation, and makes it possible to provide a low power consumption wireless communication system that can be used regardless of location.

Solutions to Problems

A transmission device of one aspect of the present technology includes: a transmission unit configured to transmit a data frame containing predetermined data in accordance with a transmission time and a transmission frequency, after transmitting a control frame containing transmission-related information regarding the transmission time and the transmission frequency that are determined on the basis of an internal time and a terminal ID on a transmission side.

One aspect of the present technology includes: transmitting a control frame containing transmission-related information regarding a transmission time and a transmission frequency that are determined on the basis of an internal time and a terminal ID on a transmission side, and then transmitting a data frame containing predetermined data in accordance with the transmission time and the transmission frequency.

A reception device of another aspect of the present technology includes: a demodulation unit configured to demodulate a data frame containing predetermined data in accordance with a transmission time and a transmission frequency, after reception of a control frame containing transmission-related information regarding the transmission time and the transmission frequency that are determined on the basis of an internal time and a terminal ID on a transmission side.

Another aspect of the present technology includes: receiving a control frame containing transmission-related information regarding a transmission time and a transmission frequency that are determined on the basis of an internal time and a terminal ID on a transmission side, and then demodulating a data frame containing predetermined data in accordance with the transmission time and the transmission frequency.

BRIEF DESCRIPTION OF DRAWINGS

FIG. 4 is a view showing an example of a wireless resource used for transmitting a control frame.

FIG. 7 is a view showing an example of a wireless resource used for transmitting a data frame.

FIG. 26 is a block diagram showing a configuration example of a computer.

MODE FOR CARRYING OUT THE INVENTION

Hereinafter, an embodiment for implementing the present technology will be described. The description will be given in the following order.

1. First embodiment (transmission of internal time)
2. Second embodiment (transmission of wireless resource)
3. Third embodiment (transmission of wireless resource (other than code))
4. Fourth embodiment (plurality of transmissions of data frame)
5. Fifth embodiment (computer)

1. First Embodiment (Transmission of Internal Time)

<Configuration Example of Wireless Communication System>

Figure 1:
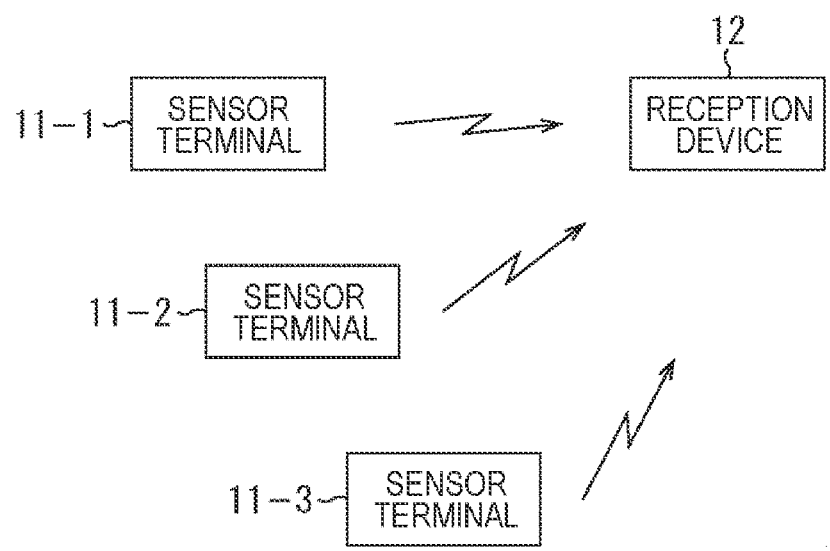
FIG. 1 is a block diagram showing a configuration example of a wireless communication system according to an embodiment of the present technology.

FIG. 1 is a block diagram showing a configuration example of a wireless communication system according to an embodiment of the present technology.

The wireless communication system of FIG. 1 is configured by connecting sensor terminals 11-1 to 11-N and a reception device 12 by wireless communication.

The wireless communication between the sensor terminals 11-1 to 11-N and the reception device 12 is one-way communication from the sensor terminals 11-1 to 11-N to the reception device 12.

Each of the sensor terminals 11-1 to 11-N constitutes a transmitting station. The sensor terminals 11-1 to 11-N are Internet of things (IoT) devices including one or more sensors. The sensor terminals 11-1 to 11-N include at least one sensor of, for example, a camera, a microphone, an acceleration sensor, an angular velocity sensor, a geomagnetic sensor, an illuminance sensor, a temperature sensor, a humidity sensor, a moisture sensor, an optical sensor, an atmospheric pressure sensor, a positioning sensor, and the like.

Hereinafter, in a case where it is not necessary to distinguish the sensor terminals 11-1 to 11-N, they are collectively referred to as a sensor terminal 11, as appropriate.

For example, the sensor terminal 11 measures a measurement target and transmits a data frame containing sensor data representing a measurement result, to the reception device 12.

At that time, the sensor terminal 11 transmits a control frame to the reception device 12 prior to the transmission of the data frame. The control frame contains transmission-related information regarding a transmission time and a transmission frequency that are determined on the basis of an internal time and a terminal ID on a transmission side.

The transmission-related information may be the internal time and the terminal ID of the transmission side (the sensor terminal 11), or may be a transmission time and a transmission frequency that are determined on the basis of the internal time and the terminal ID. Note that, in the first embodiment, the control frame contains the internal time and the terminal ID as transmission-related information.

The reception device 12 constitutes a receiving station. After receiving the control frame transmitted from the sensor terminal 11, the reception device 12 receives the data frame transmitted from the sensor terminal 11, by using the transmission-related information obtained by receiving the control frame.

With the transmission-related information obtained by receiving the control frame, the reception device 12 can specify (recognize) the transmission time and the transmission frequency of the data frame transmitted after the control frame, which can reduce a standby time for reception in the reception device 12.

As a result, according to the wireless communication system of FIG. 1, it is possible to provide a wireless communication system with low power consumption.

<Configuration Example of Sensor Terminal>

Figure 2:
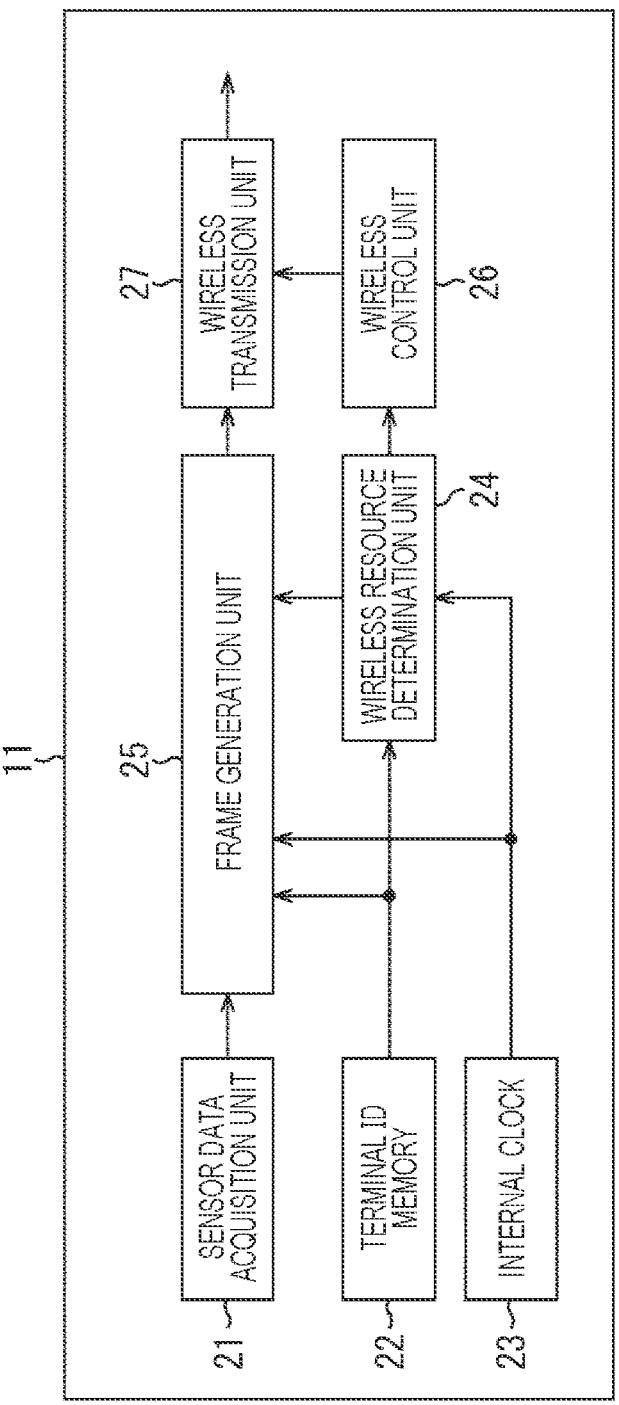
FIG. 2 is a block diagram showing a configuration example of a sensor terminal.

FIG. 2 is a block diagram showing a configuration example of the sensor terminal 11.

The sensor terminal 11 includes a sensor data acquisition unit 21, a terminal ID memory 22, an internal clock 23, a wireless resource determination unit 24, a frame generation unit 25, a wireless control unit 26, and a wireless transmission unit 27.

The sensor data acquisition unit 21 acquires sensor data representing a measurement result by the sensor described above. The sensor data may be acquired periodically, or may be acquired when an amount of change in the sensor data exceeds a certain value. The acquired sensor data is supplied from the sensor data acquisition unit 21 to the frame generation unit 25.

The terminal ID memory 22 stores a terminal ID that is a unique identifier of the sensor terminal 11. The terminal ID is defined, for example, in 32 bits. The terminal ID is supplied from the terminal ID memory 22 to the wireless resource determination unit 24 and the frame generation unit 25.

The internal clock 23 counts up on the basis of an output signal of an oscillator (not shown) mounted on the sensor terminal 11, to measure an elapsed time after power is turned on. The elapsed time measured by the internal clock 23 is supplied to the wireless resource determination unit 24 and the frame generation unit 25 as the internal time.

The wireless resource determination unit 24 determines a wireless resource on the basis of the terminal ID supplied from the terminal ID memory 22, the internal time supplied from the internal clock 23, and the like. The wireless resource includes a transmission time, a transmission frequency, a scramble code, a SYNC code, and the like, of a frame. A method of determining the wireless resource will be described in detail later, but it differs between the control frame and the data frame.

The determined wireless resource is supplied from the wireless resource determination unit 24 to the frame generation unit 25. Moreover, in the wireless resource, the transmission time and the transmission frequency are also supplied to the wireless control unit 26.

The frame generation unit 25 generates a control frame and a data frame. For generating the control frame and the data frame, the sensor data supplied from the sensor data acquisition unit 21, the terminal ID supplied from the terminal ID memory 22, the internal time supplied by the internal clock 23, the wireless resource supplied from the wireless resource determination unit 24, and the like are used as needed. The control frame and the data frame are supplied from the frame generation unit 25 to the wireless transmission unit 27.

The wireless control unit 26 controls the wireless transmission unit 27 so as to transmit a wireless signal, in accordance with the transmission time and the transmission frequency supplied from the wireless resource determination unit 24.

The wireless transmission unit 27 converts the control frame and the data frame (hereinafter collectively referred to as a frame) supplied from the frame generation unit 25 into a wireless signal in accordance with control from the wireless control unit 26, and transmits to the reception device 12.

<Configuration Example of Frame>

Figure 3:
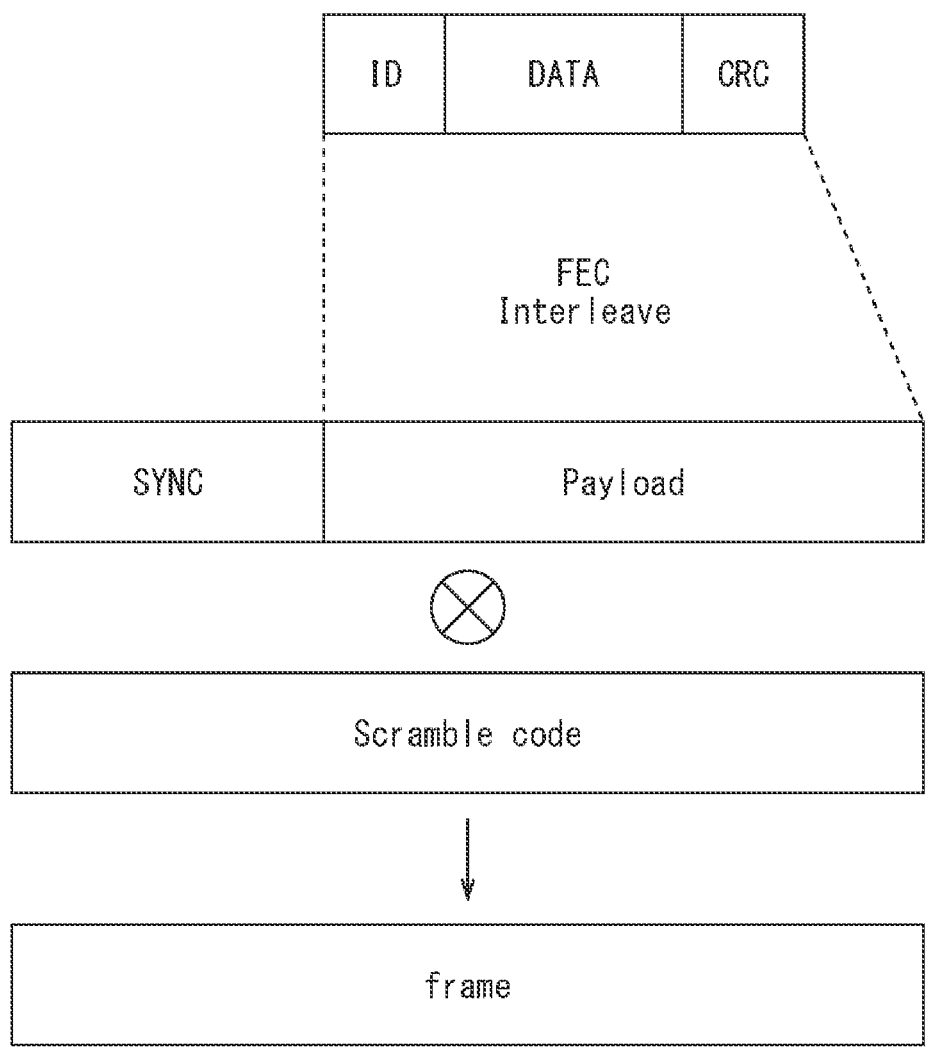
FIG. 3 is a view showing a configuration example of a frame.

FIG. 3 is a view showing a configuration example of a frame.

The frame includes fields of a SYNC code and Payload. The Payload has fields such as ID, DATA, and cyclic redundancy check (CRC).

The control frame and the data frame are different in information stored in DATA.

First, a configuration of the control frame will be described.

The ID contains a terminal ID. The DATA contains an internal time supplied by the internal clock 23. For example, the internal time is an internal time supplied from the internal clock 23 to the frame generation unit 25 when the control frame is transmitted, when the control frame is generated, or the like. The CRC contains a value that is calculated for the ID and the DATA and to be used for determining reception success on a reception side.

The frame generation unit 25 performs error correction (forward error correction: FEC) or Interleave on a sequence in which the ID, the DATA, and the CRC are concatenated, and generates the Payload. For the error correction, for example, a convolutional code, an LDPC code, or the like is used.

After concatenating the Payload and the SYNC code of the control frame, the frame generation unit 25 takes an exclusive OR (XOR) for every bit with a scramble code of the control frame, to generate a control frame (frame).

Next, a configuration of the data frame will be described.

The ID contains a terminal ID. The DATA contains sensor data. Similarly to the control frame, the CRC contains a value that is calculated for the ID and the DATA and to be used for determining reception success on a reception side.

Similarly to the case of the control frame, the frame generation unit 25 performs error correction and interleave on a sequence in which the ID, the DATA, and the CRC are concatenated, and generates the Payload.

After concatenating the Payload and the SYNC code of the data frame, the frame generation unit 25 takes an exclusive OR for every bit with a scramble code of the data frame, and generates a data frame (frame).

<Wireless Resource of Control Frame>

FIG. 4 is a view showing an example of a wireless resource used for transmitting a control frame.

The wireless resource of the control frame include a transmission time, a transmission frequency, a scramble code of the control frame, and a SYNC code of the control frame.

The transmission time of the control frame is a time obtained by adding a time α required for transmitting the control frame, to a current internal time (any time) from the internal clock 23. The transmission time of the control frame is a time that is to be an internal time after lapse of time α, and may be contained in the DATA as the internal time when the control frame is generated.

The transmission frequency of the control frame is a frequency (band) for transmitting the control frame, and is determined by selecting any frequency from the available frequencies. For example, the transmission frequency is randomly determined.

The scramble code of the control frame is generated by a pseudo-random number generator of FIG. 5 described later. A detailed description of the pseudo-random number generator will be described later with reference to FIG. 5.

As an initial value of the scramble code of the control frame, a common value of the wireless communication system is used. A length of the scrambled code of the control frame is a length that matches a frame length.

The SYNC code of the control frame is generated by a pseudo-random number generator of FIG. 6 described later.

The pseudo-random number generator is a gold code generator configured by using two M-sequence pseudo-random number generators. A detailed description of the gold code generator will be given later with reference to FIG. 6.

Each initial value of the two M-sequence pseudo-random number generators for generation of the SYNC code of the control frame is a common value of the wireless communication system. A length of the SYNC code of the control frame is a length that matches a SYNC length of the frame.

<Configuration of Pseudo-Random Number Generator>

Figure 5:
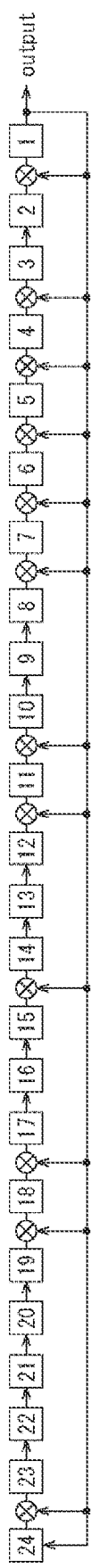
FIG. 5 is a view showing a configuration example of a pseudo-random number generator used for generating a scramble code.

FIG. 5 is a view showing a configuration example of a pseudo-random number generator used for generating a scramble code.

A square shown in FIG. 5 represents a digital delay element. From the right, digital delay elements #1 to #24 are sequentially arranged side by side in a row. When a clock is advanced by one, digital data of 0 or 1 held in the delay elements #1 to #24 is outputted to a subsequent stage, and data coming in from the input is held in the delay elements #1 to #24.

A cross mark on a circle in the figure represents an exclusive OR (XOR) arithmetic unit. The arithmetic unit is arranged at a pre-stage of the delay element #1, each pre-stage of the delay elements #3 to #7, a pre-stage of the delay element #10, a pre-stage of the delay element #11, a pre-stage of the delay element #14, a pre-stage of the delay element #17, a pre-stage of the delay element #18, and a pre-stage of the delay element #23.

In the pseudo-random number generator of FIG. 5, when a clock is advanced by one, data held in the delay element #1 is individually outputted to each arithmetic unit.

Furthermore, the held data is inputted to each arithmetic unit from each delay element in the pre-stage. When the data outputted from the delay element #1 is inputted to each arithmetic unit, in each arithmetic unit, exclusive OR processing is performed on data outputted from the arithmetic element #1 and data inputted from the delay element of each pre-stage. A processing result is individually outputted to the delay element located in a subsequent stage of the arithmetic unit.

In this way, the output is generated while values held in the delay elements #1 to #24 are updated.

Furthermore, by advancing the clock by a length required for output, random digital data of a desired length can be obtained. Note that an equation expressing a relationship of numbers of the arithmetic unit or the delay element is called a generation polynomial. FIG. 5 is a view obtained by schematizing the generation polynomial. The generation polynomial may be represented by either an equation or a figure, since the equation and the figure have a unique relationship.

For example, the generation polynomial of the pseudo-random number generator in FIG. 5 is expressed by the following Equation (1).

[Formula 1]

$$P(x) = x[24] + x[23] + x[18] + x[17] + x[14] + \\ x[11] + x[10] + x[7] + x[6] + x[5] + x[4] + x[3] + x[1] + 1 \quad (1)$$

The initial value of the pseudo-random number generator means digital data held in a delay element #i of the pseudo-random number generator in an initial state. Each bit of digital data as the initial value (in a case of FIG. 5, a common value of the wireless communication system) is set as an initial state value of each delay element #i. If the initial state of each delay element #i, that is, the initial value is the same, an output (pseudo-random number) generated when the clock is advanced has the same value.

<Configuration of Pseudo-Random Number Generator>

Figure 6:
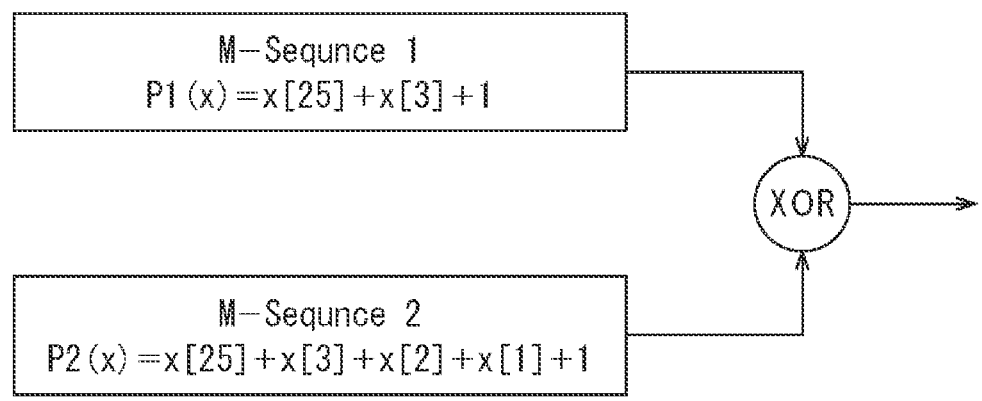
FIG. 6 is a diagram showing a configuration example of a gold code generator used for generating a SYNC code.

FIG. 6 is a diagram showing a configuration example of a gold code generator as a pseudo-random number generator used for generating a SYNC code.

The gold code generator shown in FIG. 6 includes two pseudo-random number generators configured to output M-sequences and an exclusive OR (XOR) arithmetic unit.

In FIG. 6, the two pseudo-random number generators are represented by Equations (2) and (3), which are the following two generation polynomials.

[Formula 2]

$$P1(x)=x[25]+x[3]+1 \quad (2)$$

[Formula 3]

$$P2(x)=x[25]+x[3]+x[1]+1 \quad (3)$$

Since each operation of the two pseudo-random number generators is similar to the operation of the pseudo-random number generator shown in FIG. 5, the description thereof will be omitted. As described above, each initial value of each of the two pseudo-random number generators is a common value of the wireless communication system. An arithmetic result of the M-sequence exclusive logic, which is an output generated when the clock is advanced in each of the two pseudo-random number generators, is to be an output (pseudo-random number) from the gold code generator shown in FIG. 6.

<Wireless Resource of Data Frame>

FIG. 7 is a view showing an example of a wireless resource used for transmitting a data frame.

The wireless resource of the data frame includes a transmission time, a transmission frequency, a scramble code, and a SYNC code, of the data frame.

The transmission time of the data frame is determined on the basis of an internal time and a terminal ID contained in a control frame transmitted (immediately) before transmission of the data frame.

Similarly to the transmission time of the data frame, the transmission frequency of the data frame is also determined on the basis of the internal time and the terminal ID contained in the control frame transmitted (immediately) before transmission of the data frame.

The scrambled code of the data frame is generated by the pseudo-random number generator described above with reference to FIG. 5, similarly to the scrambled code of the control frame. An initial value of the scramble code of the data frame is the terminal ID. A length of the scrambled code of the data frame is a length that matches a frame length.

The SYNC code of the data frame is generated by the gold code generator described above with reference to FIG. 6, similarly to the SYNC code of the control frame.

However, an initial value of one pseudo-random number generator included in the gold code generator is the terminal ID, while an initial value of another pseudo-random number generator is a common value of the wireless communication system. A length of the SYNC code of the data frame is a length that matches a SYNC length of the frame.

<Transmission Example of Data Frame>

Figure 8:
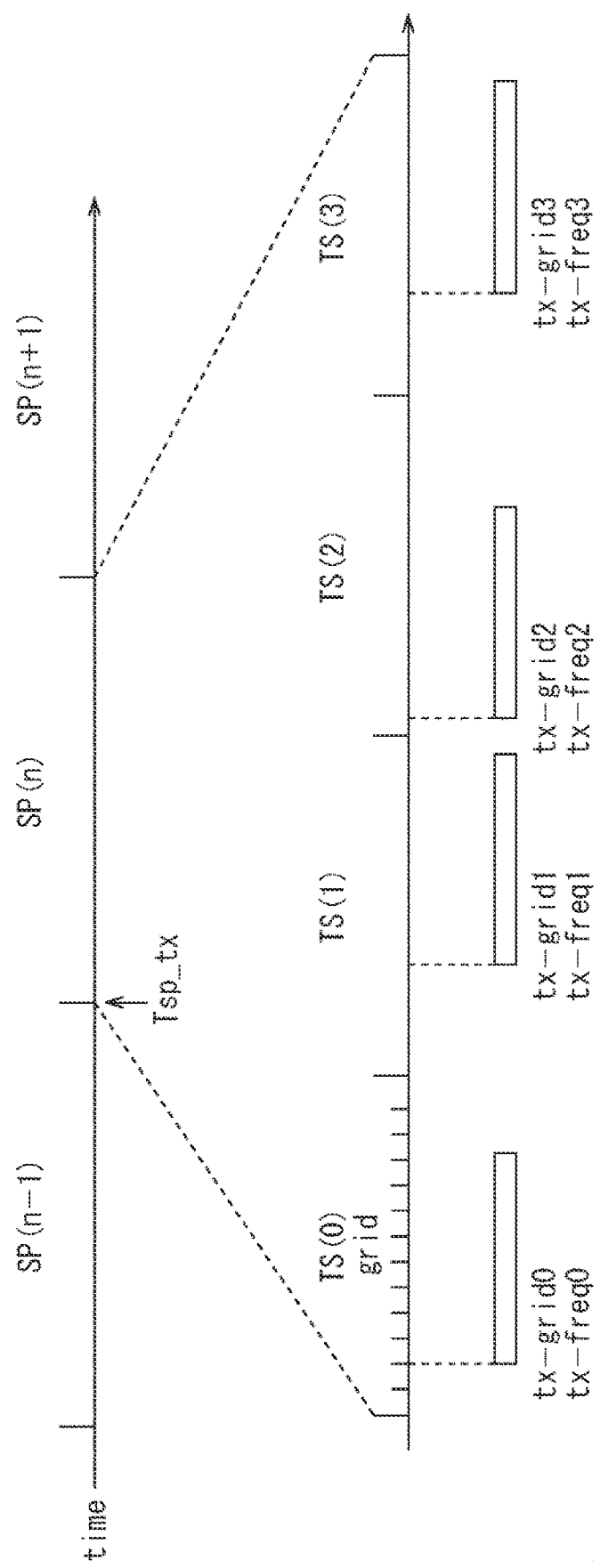
FIG. 8 is a timing chart showing a transmission example of a data frame.

FIG. 8 is a timing chart showing a transmission example of a data frame.

At transmission of the data frame, the same data frame is transmitted four times. The data frame is transmitted four times within a predetermined section called Superframe (SP) shown in an upper part of FIG. 8. Note that, for the transmission of four times, different transmission frequencies are individually used.

The SP is set such that SP (1), SP (2), ..., SP of SP (n−1), SP (n), SP (n+1) for every predetermined section, with the internal time contained in the control frame as a reference. 1, 2, ... n−1, n, n+1, ... in parentheses represent SP numbers.

The SP is further divided into four sections called Timeslots (TSs), and the same data frame is transmitted once in each TS. The data frame is represented by a horizontally long rectangle in FIG. 8.

The inside of the TS is divided into sections called grids, and the data frame is transmitted with beginning of any of the grids as a start-time point.

In FIG. 8, in TS (0), the first data frame is transmitted at a transmission frequency indicated by tx-freq0 at the grid indicated by tx-grid0. In TS (1), the second data frame is transmitted at a transmission frequency indicated by tx-freq1 at the grid indicated by tx-grid1. In TS (2), the third data frame is transmitted at a transmission frequency indicated by tx-freq2 at the grid indicated by tx-grid2. In TS (3), the fourth data frame is transmitted at a transmission frequency indicated by tx-freq3 at the grid indicated by tx-grid3.

A start time (Tsp_tx) of the SP with the SP number n in which the data frame is transmitted is determined by the following Equation (4).

[Formula 4]

$$T_{sp\_tx} = SP \cdot \text{floor}\left(\frac{t}{SP}\right) + SP \cdot \left(1 + \text{mod}\left(\frac{ID}{N}\right)\right) \quad (4)$$

Here, SP represents a length of the SP. t represents an internal time contained in the control frame. Floor (t/SP) represents an integer with a fraction after the decimal point is truncated in t/SP. ID represents a terminal ID, and represented in, for example, 32 bits. N represents a period in which the sensor terminal 11 is assigned to the SP. mod (ID/N) represents a remainder of ID/N.

Next, a gold code generator configured by using two M-sequence pseudo-random number generators is used to determine a transmission time of the data frame in each TS. The gold code generator used to determine the transmission time of the data frame within each TS has a configuration same as that of the gold code generator described above with reference to FIG. 6 except that the generation polynomial is different, and thus the description thereof is omitted.

The two pseudo-random number generators included in the gold code generator used to determine the transmission time of the data frame in each TS are represented by Equations (5) and (6), which are the following generation polynomials.

[Formula 6]

$$Q2(x) = x[32] + x[30] + x[17] + x[12] + x[3] + x[1] + 1 \quad (6)$$

The determined start time of the SP with the SP number n and the terminal ID are used as initial values of the pseudo-random number generators represented by the generation polynomials of Equations (5) and (6). In the gold code generator, the wireless resource determination unit 24 operates the pseudo-random number generators represented by the generation polynomials in Equations (5) and (6) described above, to generate a pseudo-random number sequence of a required length. The length of the pseudo-random number sequence is a length required for determining a transmission time and determining a frequency described later.

<Method of Determining Transmission Time of Data frame in TS>

Figure 9:
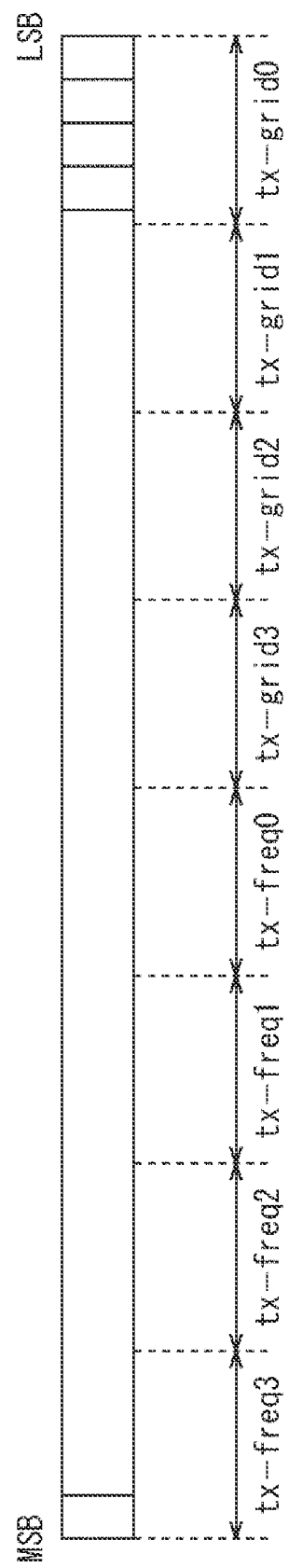
FIG. 9 is a view showing an example of a method of determining a transmission time and a transmission frequency in a TS.

FIG. 9 is a view showing an example of a method of determining a transmission time and a transmission frequency of a data frame in a TS.

FIG. 9 shows, from the left side, MSB to LSB of a pseudo-random number sequence generated by the gold code generator configured by using the pseudo-random number generators represented by the generation polynomials of Equations (5) and (6). From the LSB side (right side), a transmission time tx-grid0, a transmission time tx-grid1, a transmission time tx-grid2, and a transmission time tx-grid3 are assigned for every four bits.

The transmission time tx-grid0 assigned in FIG. 9 is a transmission time of a data frame in the TS of the TS number (0) in FIG. 8. The transmission time tx-grid1 assigned in FIG. 9 is a transmission time of a data frame in the TS of the TS number (1) in FIG. 8. The transmission time tx-grid2 assigned in FIG. 9 is a transmission time of a data frame in the TS of the TS number (2) in FIG. 8. The transmission time tx-grid3 assigned in FIG. 9 is a transmission time of a data frame in the TS of the TS number (3) in FIG. 8.

That is, from the LSB side of the pseudo-random number sequence generated by the gold code generator configured by using the pseudo-random number generators represented by the generation polynomials of Equations (5) and (6) described above, the transmission time in the TS is determined by the following Equation (7) on the basis of a value cut out every four bits, for example.

[Formula 7]

$$T_{ts(m)} = GP \cdot \text{mod}\left(\frac{X}{GP_{max\_n}}\right) \quad (7)$$

Here, Tts (m) represents a transmission time of a data frame in each TS. m represents 0, 1, ..., TS number−1. In a case of FIG. 8, m=0, 1, 2, 3. GP represents a grid interval in the TS. GPmax_n represents the number of grids in the TS. x represents a value cut out from the pseudo-random number sequence. mod (x/GPmax_n) represents a remainder of x/GPmax_n.

That is, the wireless resource determination unit 24 determines the transmission time of the data frame in the four TSs in the SP, on the basis of a value cut out by shifting a bit to be cut out from the pseudo-random number sequence.

The data frame is transmitted four times, but as described above, all four times are transmitted at different transmission frequencies. A method of determining the transmission frequencies of the four times is determined from the internal time and the terminal ID contained in the control frame, similarly to the method of determining the transmission time.

Again, with reference to FIG. 9, in the pseudo-random number sequence of FIG. 9, following the bit to which the transmission time tx-grid3 is assigned, a transmission frequency tx-freq0, a transmission frequency tx-freq1, a transmission frequency tx-freq2, and a transmission frequency tx-freq3 are assigned for every four bits.

The transmission frequency tx-freq0 assigned in FIG. 9 is a transmission frequency of a data frame in the TS of the TS number (0) in FIG. 8. The transmission frequency tx-freq1 assigned in FIG. 9 is a transmission frequency of a data frame in the TS of the TS number (1) in FIG. 8. The transmission frequency tx-freq2 assigned in FIG. 9 is a transmission frequency of a data frame in the TS of the TS number (2) in FIG. 8. The transmission frequency tx-freq3 assigned in FIG. 9 is a transmission frequency of a data frame in the TS of the TS number (3) in FIG. 8.

As shown in FIG. 9, from the upper 16 bits in the pseudo-random number sequence used to determine the transmission time, the transmission frequency of the data frame in the TS is, for example, determined by the following Equation (8) on the basis of a value cut out every four bits.

[Formula 8]

$$F_{ts(m)} = \mod\left(\frac{x}{F_n}\right) \tag{8}$$

Here, Fts (m) represents a number indicating a transmission frequency of a data frame transmitted in each TS. Fn is an upper limit value of a frequency that can be used, and represents a fixed value predetermined in the wireless communication system. x represents a value cut out from the pseudo-random number sequence. mod (x/Fn) represents a remainder of x/Fn.

As described above, the transmission frequency and the transmission time, which is a time when the transmission of the data frame is started, are determined. As described above, the transmission time and the transmission frequency of the data frame can be determined on the basis of the internal time and the terminal ID contained in the control frame.

Next, the reception device 12 that receives the control frame and the data frame transmitted from the sensor terminal 11 will be described.

<Configuration of Reception Device>

Figure 10:
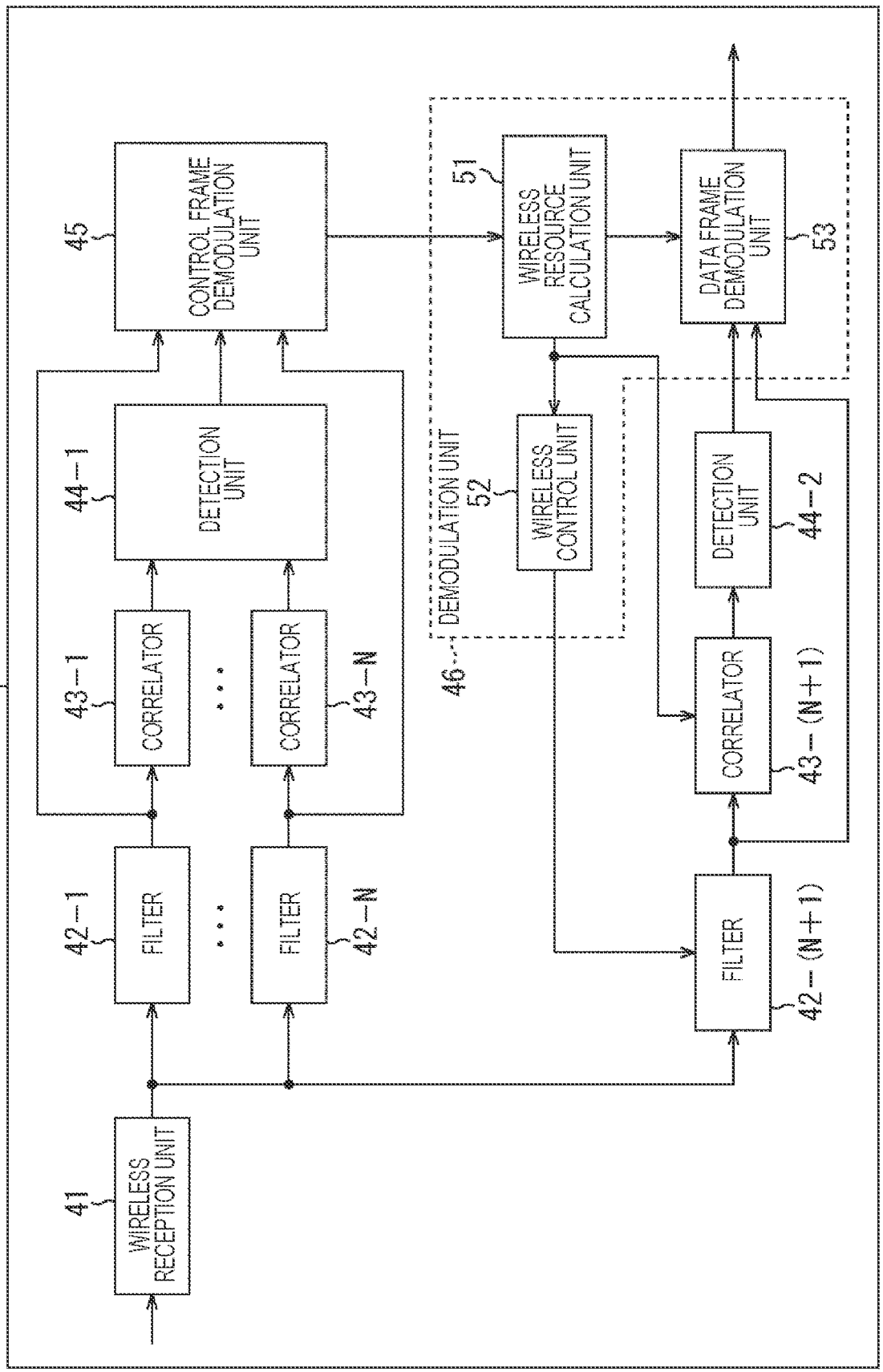
FIG. 10 is a block diagram showing a configuration example of a reception device.

FIG. 10 is a block diagram showing a configuration example of the reception device 12.

The reception device 12 includes a wireless reception unit 41, filters 42-1 to 42-N, a filter 42-(N+1), correlators 43-1 to 43-N, a correlator 43-(N+1), detection units 44-1 and 44-2, a control frame demodulation unit 45, and a demodulation unit 46.

The wireless reception unit 41 receives a wireless signal, and converts the received wireless signal into, for example, a broadband signal including a plurality of frequencies. The wireless signal is converted into a broadband signal that includes all the frequencies supported by the wireless communication system. For example, in a case of a domestic wireless communication system corresponding to a 920 MHz band and corresponding to frequencies of CH33 (922.4 MHz) to CH64 (928.0 MH), the broadband signal includes CH33 to CH64. The converted broadband signal is supplied from the wireless reception unit 41 to the filters 42-1 to 42-N and the filters 42-(N+1).

The filters 42-1 to 42-N and the filter 42-(N+1) are filters to take out frequency band signals from the broadband signal supplied from the wireless reception unit 41. For example, the filter 42-1 is a filter to take out signals in the frequency band of CH33. For example, the filter 42-N is a filter to take out signals in the frequency band of CH64.

The filters 42-1 to 42-N supply signals in the frequency band taken out from the broadband signal, to the corresponding correlators 43-1 to 43-N and the control frame demodulation unit 45.

The filter 42-(N+1) takes out, from the broadband signal, a signal of a frequency band set by the demodulation unit 46, and supplies the taken out frequency band signal to the correlator 43-(N+1) and the demodulation unit 46.

Hereinafter, in a case where it is not necessary to distinguish the filters 42-1 to 42-N, 42-(N+1) in particular, they are referred to as a filter 42.

The correlators 43-1 to 43-N calculate a correlation value between a signal supplied from the filters 42-1 to 42-N and a specified sequence that has been specified. The correlators 43-1 to 43-N calculate the correlation value by using, as a specified sequence, a sequence combining a SYNC code and a scramble code of a control frame. The correlation value is supplied from the correlators 43-1 to 43-N to the detection unit 44-1.

The correlator 43-(N+1) calculates a correlation value between a signal supplied by the filter 42-(N+1) and a specified sequence that has been specified. The correlator 43-(N+1) calculates the correlation value by using, as a specified sequence, a sequence combining a SYNC code and a scramble code of a data frame from the demodulation unit 46. The correlation value is supplied from the correlator 43-(N+1) to the detection unit 44-2. The SYNC code and scramble code of the data frame are determined on the basis of a terminal ID.

Hereinafter, in a case where it is not necessary to distinguish between the correlators 43-1 to 43-N and 43-M in particular, they are referred to as a correlator 43.

In a case where any of the correlation values supplied from the correlators 43-1 to 43-N has a value equal to or higher than a certain value, the detection unit 44-1 determines that a control frame has been detected. The detection unit 44-1 supplies a time at which the control frame is detected, to the control frame demodulation unit 45.

In a case where the correlation value supplied from the correlator 43-(N+1) has a value equal to or higher than a certain value, the detection unit 44-2 determines that a data frame has been detected. The detection unit 44-2 supplies a time at which the data frame is detected, to the demodulation unit 46.

The control frame demodulation unit 45 demodulates a control frame from a signal supplied from the filter 42, on the basis of the time supplied from the detection unit 44-1. The control frame demodulation unit 45 extracts the control frame from the signal supplied from the filter 42, on the basis of the time supplied from the detection unit 44-1. The control frame demodulation unit 45 descrambles the extracted control frame with a common scramble code of the wireless communication system.

The control frame demodulation unit 45 takes out Payload from the descrambled control frame, releases Interleave, decodes error correction, and detects an error by using CRC. In a case where the control frame is correctly received, the control frame demodulation unit 45 acquires a terminal ID and an internal time contained in DATA from Payload, and supplies the acquired terminal ID and internal time to the demodulation unit 46.

The demodulation unit 46 controls the filter 42-(N+1) and the correlator 43-(N+1) in accordance with the terminal ID and the internal time supplied from the control frame demodulation unit 45, and demodulates the data frame from the signal supplied from the filter 42-(N+1), on the basis of a time supplied from the detection unit 44-2.

The demodulation unit 46 includes a wireless resource calculation unit 51, a wireless control unit 52, and a data frame demodulation unit 53.

The wireless resource calculation unit 51 calculates a wireless resource to be used for receiving a data frame, on the basis of the terminal ID and the internal time supplied from the control frame demodulation unit 45. For the calculation of the wireless resource, the same calculation method as the calculation method in the sensor terminal 11 described above is used.

The calculation of the wireless resource gives a reception time at which the data frame is received, a reception frequency, a scramble code, and a SYNC code. A value of the reception time is the same value as the value of a transmission time of transmission by the sensor terminal 11. A value of the reception frequency is the same value as a value of the transmission frequency of transmission by the sensor terminal 11.

The reception time and the reception frequency are supplied from the wireless resource calculation unit 51 to the wireless control unit 52. The scramble code and the SYNC code are codes determined on the basis of the terminal ID, and are supplied from the wireless resource calculation unit 51 to the correlator 43-(N+1). The scramble code is supplied from the wireless resource calculation unit 51 to the data frame demodulation unit 53.

The wireless control unit 52 operates the filter 42-(N+1) in accordance with the reception time supplied from the wireless resource calculation unit 51. At that time, the wireless control unit 52 sets the reception frequency of the filter 42-(N+1) such that a signal of the reception frequency supplied from the wireless resource calculation unit 51 is taken out.

The data frame demodulation unit 53 demodulates a data frame from a signal supplied from the filter 42-(N+1), on the basis of the time supplied from the detection unit 44-2. The data frame demodulation unit 53 extracts the data frame from the signal supplied from the filter 42-(N+1), on the basis of the time supplied from the detection unit 44-2. The data frame demodulation unit 53 descrambles the data frame with the scramble code supplied from the wireless resource calculation unit 51.

The data frame demodulation unit 53 takes out Payload from the descrambled data frame, releases Interleave, decodes error correction, and detects an error by using CRC. The data frame demodulation unit 53 acquires the sensor data contained in DATA in a case where the data frame is correctly received.

Figure 11:
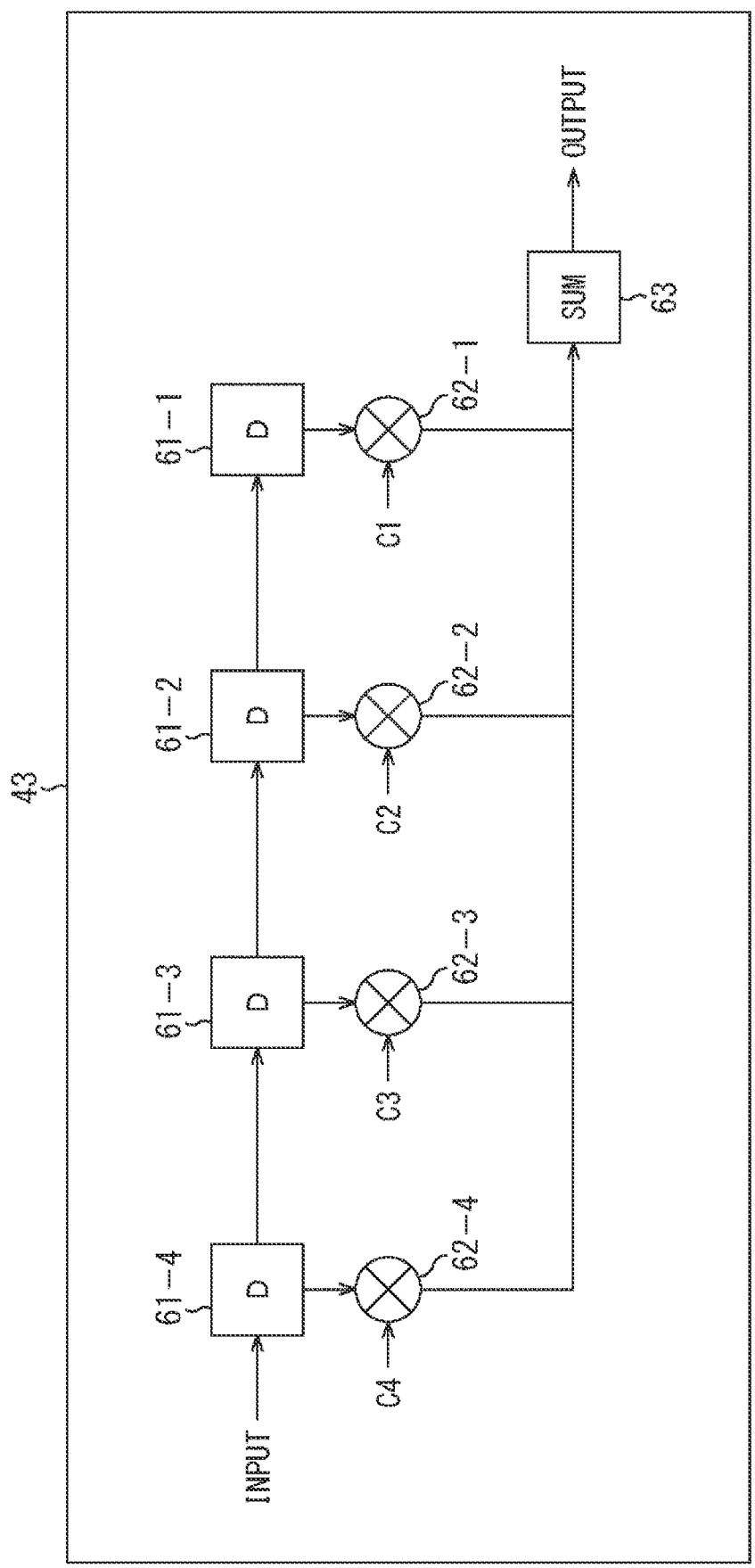
FIG. 11 is a circuit diagram showing a configuration example of a correlator.

FIG. 11 is a circuit diagram showing a configuration example of the correlator 43.

FIG. 11 shows an example of calculating a correlation value with specified sequence C1, C2, C3, and C4. Note that a length of the sequence in the figure is 4. Usually, a correlator of the required length is used.

The correlator 43 includes delayers 61-1 to 61-4, multipliers 62-1 to 62-4, and an adder 63.

The delayers 61-1 to 61-4 delay an input signal by one clock at a time. The delayer 61-4 delays an input signal by one clock, and supplies a delay signal obtained by the delay to the delayer 61-3 in a subsequent stage and the corresponding multiplier 62-4. By using the delay signal from the delayer 61-4 as an input signal, the delayer 61-3 delays the input signal by one clock, and supplies a delay signal obtained by the delay to the delayer 61-2 in a subsequent stage and the corresponding multiplier 62-3.

By using the delay signal from the delayer 61-3 as an input signal, the delayer 61-2 delays the input signal by one clock, and supplies a delay signal obtained by the delay to the delayer 61-1 in a subsequent stage and the corresponding multiplier 62-2. By using the delay signal from the delayer 61-2 as an input signal, the delayer 61-1 delays the input signal by one clock, and supplies a delay signal obtained by the delay to the corresponding multiplier 62-1.

The multipliers 62-1 to 62-4 multiply each delay signal supplied from the delayers 61-1 to 61-4 by values of the specified sequence C1, C2, C3, and C4, and supply to the adder 63. The adder 63 adds the multiplied values supplied from the multipliers 62-1 to 62-4 and outputs as a correlation value to a subsequent stage.

Figure 12:
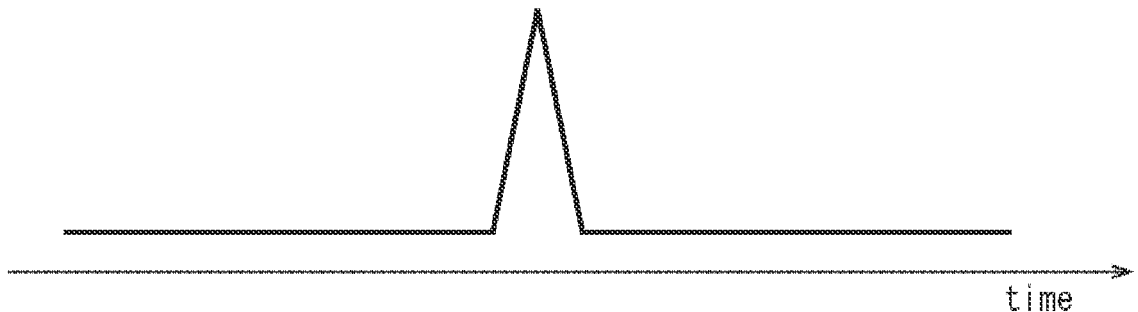
FIG. 12 is a view showing an example of an output of the correlator.

FIG. 12 is a view showing an example of an output of the correlator 43.

As shown in FIG. 12, the correlator 43 operates such that the output from the correlator 43 shows a large value at a timing when an input signal matches a specified sequence that has been specified, and shows a small value in other parts.

In a case of a control frame, in the correlator 43, a sequence combining a scrambled code and a SYNC code of the control frame is set as the specified sequence described above. The sequence combining the scramble code and the SYNC code of the control frame is arranged at the beginning of the control frame. As a result, the detection unit 44-1 can detect the beginning of the control frame shown in FIG. 3.

In a case of a data frame, in the correlator 43-(N+1), a sequence combining a scramble code and a SYNC code of the data frame is set as the specified sequence. The sequence combining the scramble code and the SYNC code of the data frame is arranged at the beginning of the data frame. As a result, the detection unit 44-2 can detect the beginning of the data frame shown in FIG. 3.

<Operation of Each Device>

Figure 13:
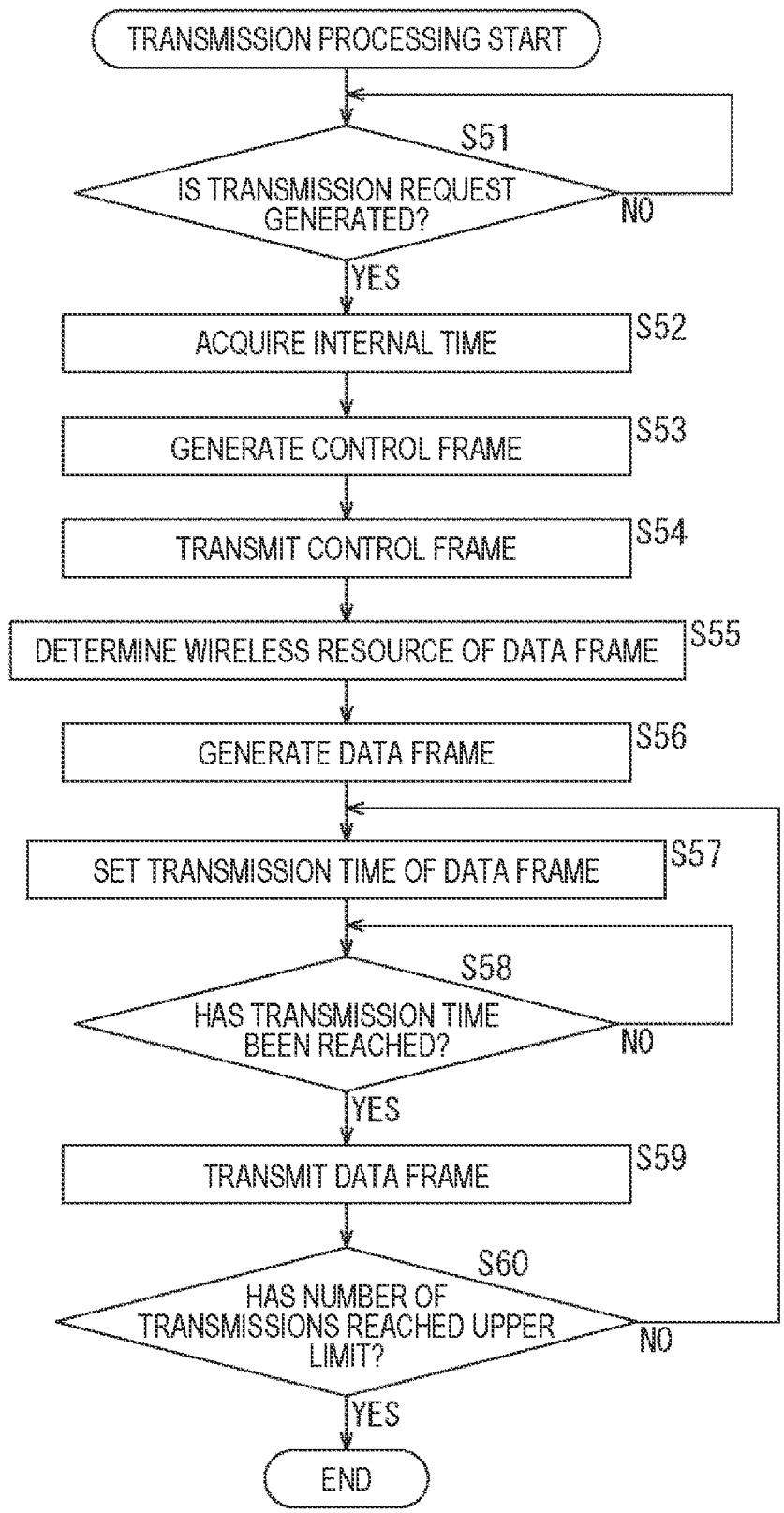
FIG. 13 is a flowchart for explaining transmission processing of the sensor terminal.
Figure 14:
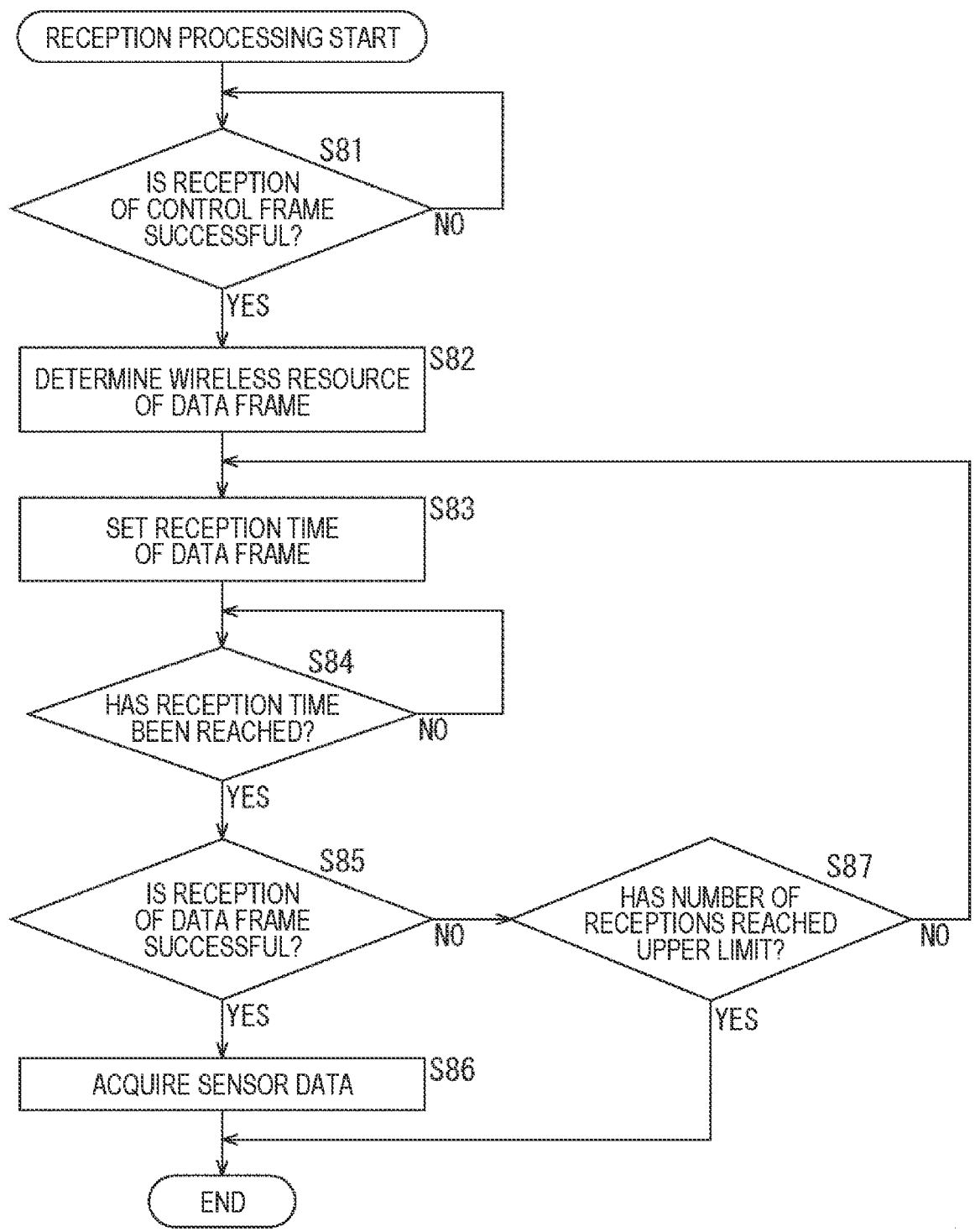
FIG. 14 is a flowchart for explaining reception processing of the reception device.
Figure 15:
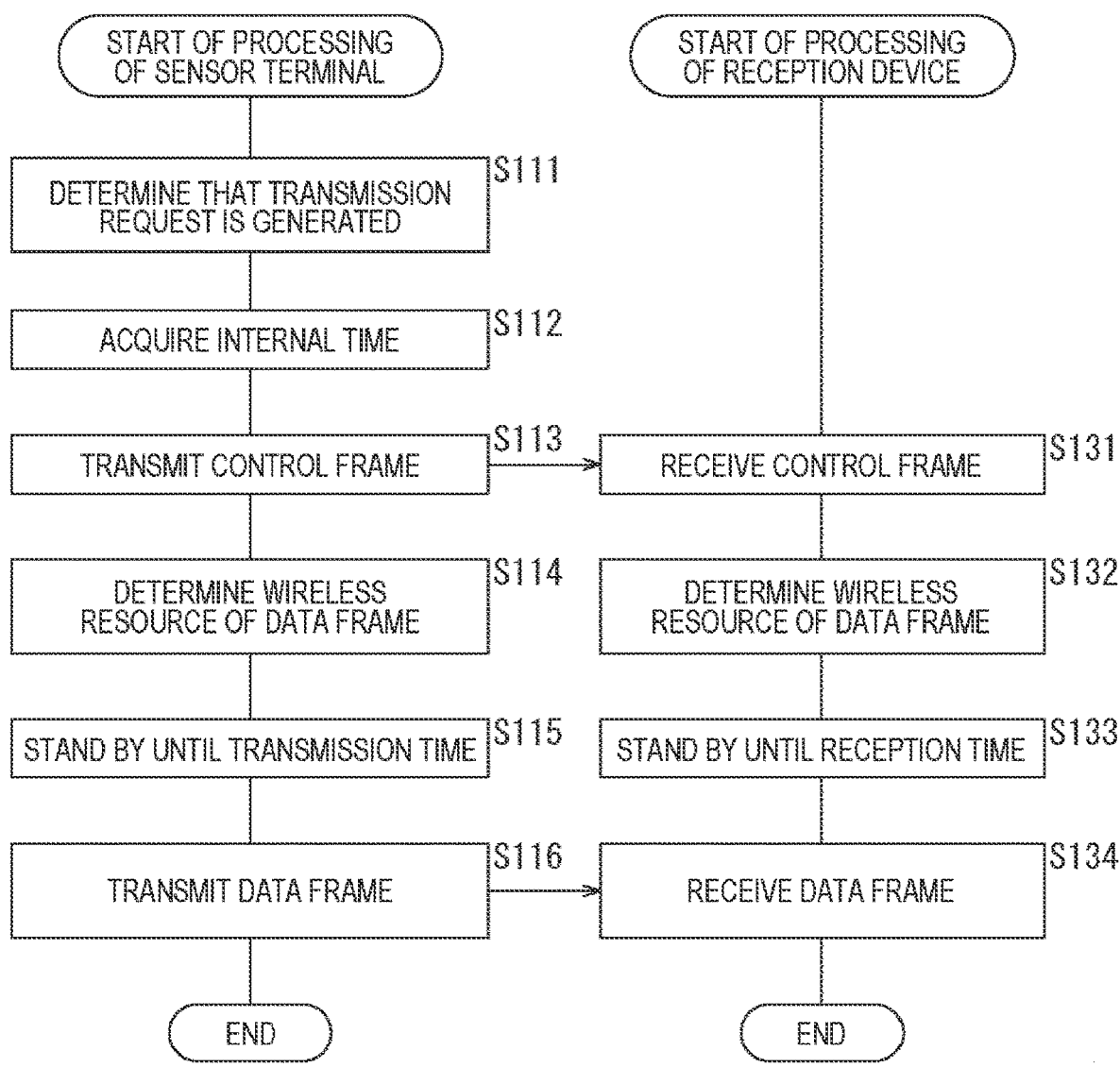
FIG. 15 is a flowchart showing a correspondence between the transmission processing of FIG. 13 and the reception processing of FIG. 14.

FIG. 13 is a flowchart for explaining transmission processing of the sensor terminal 11. FIG. 14 is a flowchart for explaining reception processing of the reception device 12. FIG. 15 is a flowchart showing a correspondence between the transmission processing of FIG. 13 and the reception processing of FIG. 14. Note that, in the description of FIGS. 13 and 14, FIG. 15 is referred to as appropriate.

First, with reference to the flowchart of FIG. 13, the transmission processing of the sensor terminal 11 will be described.

In step S51, the frame generation unit 25 stands by until it is determined that a transmission request is generated. To the frame generation unit 25, sensor data is supplied from the sensor data acquisition unit 21.

In the frame generation unit 25, a transmission request is generated periodically or when an amount of change in the sensor data exceeds a certain value. In a case where it is determined in step S51 that a transmission request is generated, the process proceeds to step S52 (step S111 in FIG. 15).

In step S52, the wireless resource determination unit 24 acquires a current internal time supplied from the internal clock 23. The wireless resource determination unit 24 determines, as a transmission time of a control frame, a time obtained by adding a time α required for transmitting the control frame to the acquired current internal time. The wireless resource determination unit 24 also determines other wireless resource (a transmission frequency, a scramble code, a SYNC code) of the control frame (step S112 in FIG. 15).

The determined wireless resource of the control frame is supplied from the wireless resource determination unit 24 to the frame generation unit 25. Moreover, the transmission time and the transmission frequency in the wireless resource of the control frame are also supplied from the wireless resource determination unit 24 to the wireless control unit 26.

In step S53, the frame generation unit 25 uses the scramble code and the SYNC code in the wireless resource of the control frame supplied from the wireless resource determination unit 24, to generate a control frame. The control frame contains the internal time supplied from the internal clock 23 and a terminal ID supplied from the terminal ID memory 22. The control frame is supplied from the frame generation unit 25 to the wireless transmission unit 27.

In step S54, in accordance with the transmission time and the transmission frequency in the wireless resource of the control frame supplied from the wireless resource determination unit 24, the wireless transmission unit 27 transmits the control frame supplied from the frame generation unit 25 (step S113 in FIG. 15).

In step S55, on the basis of the internal time contained in the control frame and the terminal ID supplied from the terminal ID memory 22, the wireless resource determination unit 24 determines a wireless resource (a transmission time, a transmission frequency, a scramble code, a SYNC code) of the data frame (step S114 in FIG. 15).

The determined wireless resource of the data frame is supplied from the wireless resource determination unit 24 to the frame generation unit 25. Moreover, the transmission time and the transmission frequency in the wireless resource of the data frame are also supplied from the wireless resource determination unit 24 to the wireless control unit 26.

In step S56, the frame generation unit 25 uses the scramble code and the SYNC code in the wireless resource of the data frame supplied from the wireless resource determination unit 24, to generate a data frame containing sensor data. The data frame is supplied from the frame generation unit 25 to the wireless transmission unit 27.

In step S57, the wireless control unit 26 sets the transmission time in the wireless resource of the data frame supplied from the wireless resource determination unit 24, to a time at which the data frame is transmitted.

In step S58, the wireless control unit 26 stands by until it is determined that the time has reached the transmission time (step S115 in FIG. 15).

In a case where it is determined in step S58 that the transmission time has been reached, the process proceeds to step S59.

In step S59, in accordance with the transmission frequency in the wireless resource of the data frame supplied from the wireless resource determination unit 24, the wireless control unit 26 controls the wireless transmission unit 27 so as to transmit the data frame supplied from the frame generation unit 25 to the wireless transmission unit 27. The wireless transmission unit 27 transmits the data frame in accordance with the control of the wireless control unit 26 (step S116 in FIG. 15).

In step S60, the wireless control unit 26 determines whether or not the number of transmissions has reached an upper limit (for example, four times).

In a case where it is determined in step S60 that the number of transmissions has not reached the upper limit, the process returns to step S57, and the subsequent processing is repeated.

In a case where it is determined in step S60 that the number of transmissions has reached the upper limit, the transmission processing is terminated.

Next, the reception processing of the reception device 12 will be described with reference to the flowchart of FIG. 14.

In step S81, the control frame demodulation unit 45 stands by until it is determined that reception of the control frame is successful.

The wireless reception unit 41 receives a wireless signal. After the filter 42 takes out a signal in a predetermined frequency band and the correlator 43 outputs a correlation value, a time at which the control frame is detected is supplied from the detection unit 44-1 to the control frame demodulation unit 45. The control frame demodulation unit 45 extracts the control frame from a signal supplied from the filter 42 on the basis of the time at which the control frame supplied from the detection unit 44-1 is detected, and demodulates the extracted control frame.

In a case where the control frame demodulation unit 45 determines in step S81 that reception of the control frame is successful, the process proceeds to step S82 (step S131 in FIG. 15). The control frame demodulation unit 45 acquires a terminal ID and an internal time contained in DATA from Payload of the control frame, and supplies to the wireless resource calculation unit 51.

In step S82, the wireless resource calculation unit 51 determines a wireless resource of the data frame on the basis of the terminal ID and the internal time supplied from the control frame demodulation unit 45 (step S132 in FIG. 15).

A reception time and a reception frequency in the wireless resource of the data frame are supplied from the wireless resource calculation unit 51 to the wireless control unit 52. A scramble code and a SYNC code in the wireless resource of the data frame are supplied from the wireless resource calculation unit 51 to the correlator 43-(N+1). The scramble code in the wireless resource of the data frame is supplied from the wireless resource calculation unit 51 to the data frame demodulation unit 53.

In step S83, the wireless control unit 52 sets the reception time in the wireless resource of the data frame supplied from the wireless resource calculation unit 51, to a time at which the data frame is received.

In step S84, the wireless control unit 52 stands by until it is determined that the time has reached the reception time (step S133 in FIG. 15). The wireless control unit 52 stands by from the time at which the control frame is received (detected) until the transmission time of the data frame by the sensor terminal 11 (the reception time determined by the wireless resource calculation unit 51).

Whereas, in a case where it is determined in step S84 that the reception time has been reached, the process proceeds to step S85.

The wireless reception unit 41 receives a wireless signal. After a signal of a frequency band supplied from the wireless resource calculation unit 51 to the wireless control unit 52 is taken out by the filter 42-(N+1), and a correlation value is outputted by the correlator 43-(N+1), a time at which the data frame is detected is supplied from the detection unit 44-2 to the data frame demodulation unit 53. On the basis of the time at which the data frame is detected and which is supplied from the detection unit 44-2, the data frame demodulation unit 53 extracts the data frame from a signal supplied from the filter 42-(N+1), and demodulates the extracted data frame.

In step S85, the data frame demodulation unit 53 determines whether or not reception of the data frame is successful.

In a case where it is determined in step S85 that reception of the data frame is successful, the process proceeds to step S86 (step S134 in FIG. 15).

In step S86, the data frame demodulation unit 53 acquires sensor data contained in DATA from Payload of the data frame. Thereafter, the reception processing is terminated.

Whereas, in a case where it is determined in step S85 that reception of the data frame is not successful, the process proceeds to step S87.

In step S87, the data frame demodulation unit 53 determines whether or not the number of receptions has reached an upper limit (four times).

In a case where it is determined in step S87 that the number of receptions has not reached the upper limit, the process returns to step S83, and the subsequent processing is repeated.

In a case where it is determined in step S87 that the number of receptions has reached the upper limit, the reception processing is terminated.

As described above, in the wireless communication system of the first embodiment, a control frame containing an internal time measured by the sensor terminal 11 and a terminal ID is transmitted as transmission-related information. Then, after the control frame is transmitted, a data frame containing sensor data as predetermined data is transmitted in accordance with a transmission time and a transmission frequency determined on the basis of the transmission-related information contained in the control frame.

As a result, it is possible to recognize, on the reception side, a wireless resource when the data frame is received, so that the standby time can be reduced when the data frame is received.

The above can be realized without using GPS signals. Therefore, according to the present technology, it is possible to provide a wireless communication system with low power consumption regardless of location, even when the sensor terminal is located anywhere (for example, a location where GPS signals cannot be received).

2. Second Embodiment (Transmission of Wireless Resource)

In the second embodiment, a control frame contains, as transmission-related information, a wireless resource (a transmission time, a transmission frequency, a scramble code, and a SYNC code) determined on the basis of an internal time and a terminal ID, instead of the internal time and the terminal ID described above in the first embodiment.

Since a configuration of a sensor terminal 11 of the second embodiment is basically the same as the configuration of the sensor terminal 11 of FIG. 2, the description thereof will be omitted. Since a configuration of a reception device 12 of the second embodiment is basically the same as the configuration of the reception device 12 of FIG. 10, the description thereof will be omitted.

<Operation of Each Device>

Figure 16:
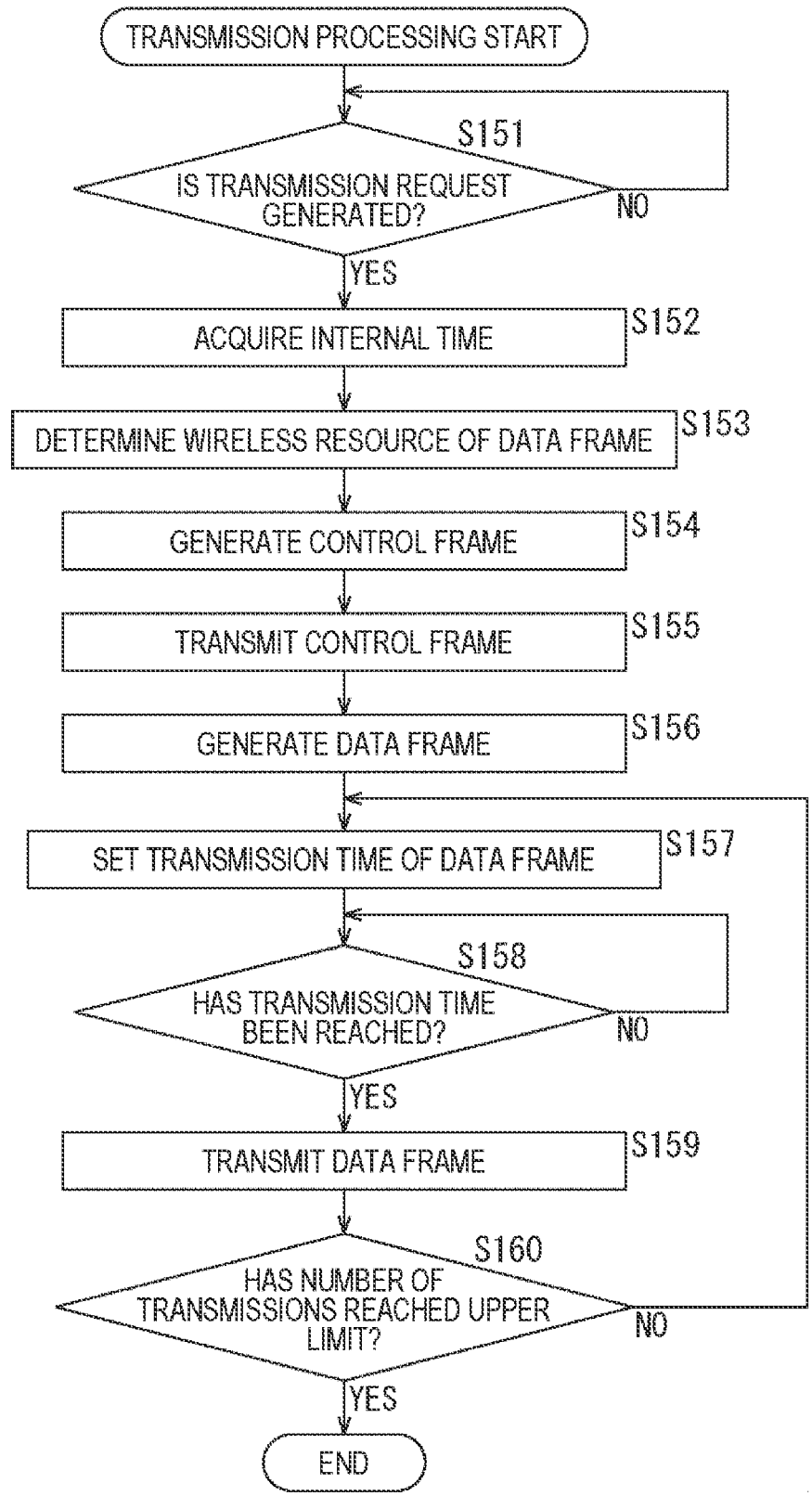
FIG. 16 is a flowchart for explaining transmission processing of a sensor terminal.
Figure 17:
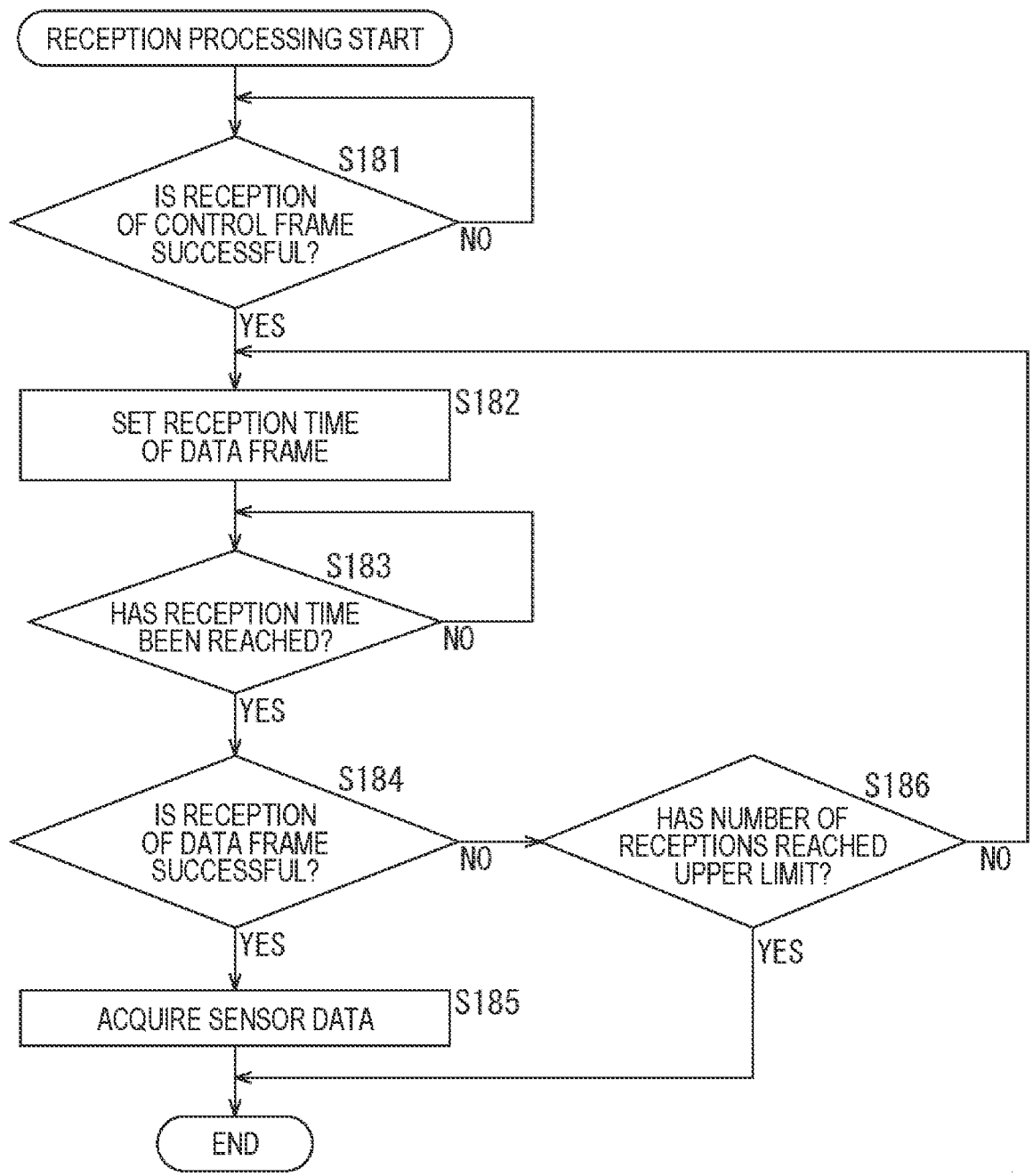
FIG. 17 is a flowchart for explaining reception processing of a reception device.
Figure 18:
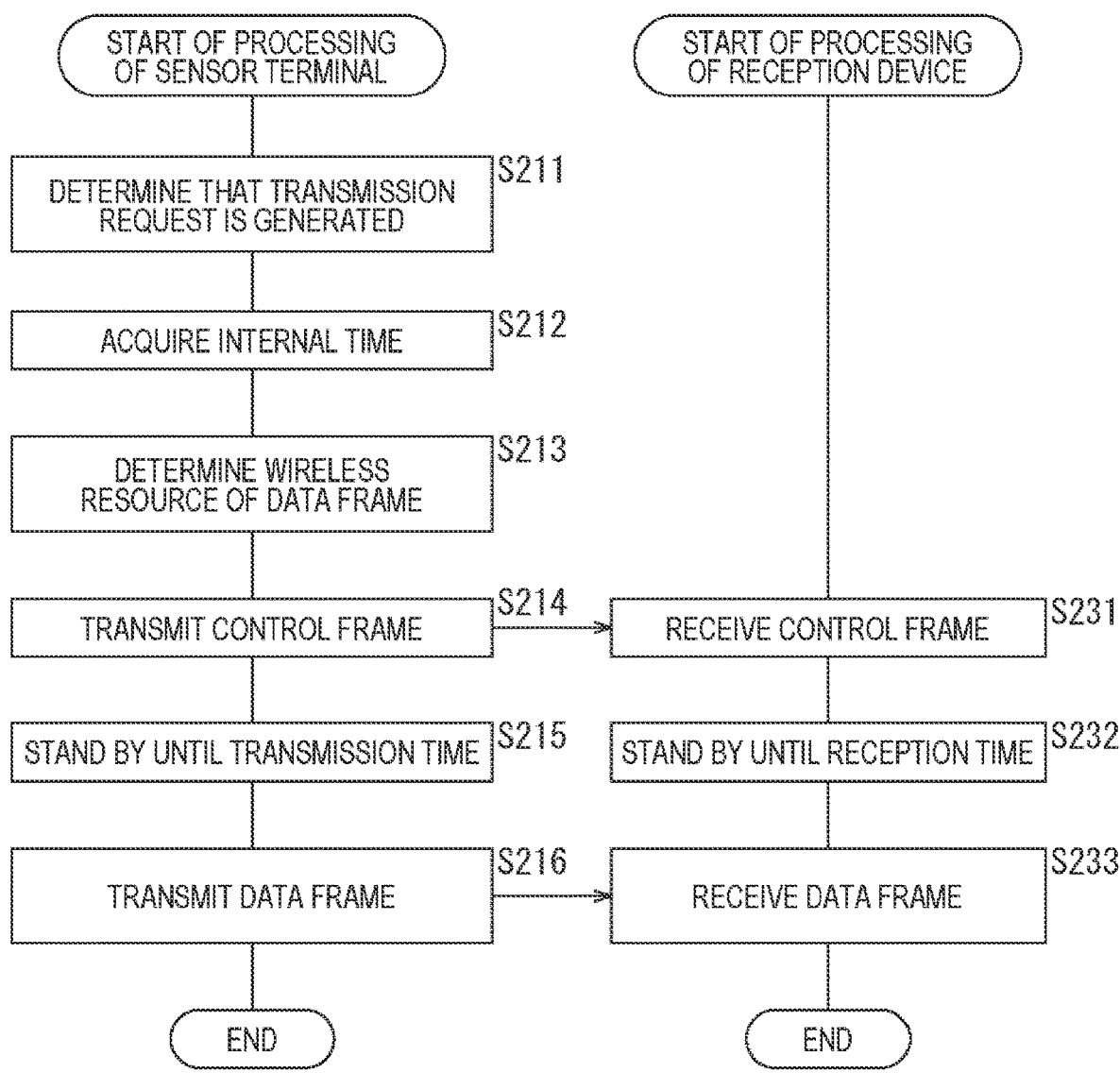
FIG. 18 is a flowchart showing a correspondence between the transmission processing of FIG. 16 and the reception processing of FIG. 17.

FIG. 16 is a flowchart for explaining transmission processing of the sensor terminal 11. FIG. 17 is a flowchart for explaining reception processing of the reception device 12. FIG. 18 is a flowchart showing a correspondence between the transmission processing of FIG. 16 and the reception processing of FIG. 17. Note that, in the description of FIGS. 16 and 17, FIG. 18 is referred to as appropriate.

First, with reference to the flowchart of FIG. 16, the transmission processing of the sensor terminal 11 will be described.

In step S151, a frame generation unit 25 stands by until it is determined that a transmission request is generated. In a case where it is determined in step S151 that a transmission request is generated, the process proceeds to step S152 (step S211 in FIG. 18).

In step S152, a wireless resource determination unit 24 acquires a current internal time supplied from an internal clock 23. The wireless resource determination unit 24 determines, as a transmission time of a control frame, a time obtained by adding a time α required for transmitting the control frame to the acquired current internal time. The wireless resource determination unit 24 also determines other wireless resource (a transmission frequency, a scramble code, a SYNC code) of the control frame (step S212 in FIG. 18).

In step S153, the wireless resource determination unit 24 determines a wireless resource (a transmission time, a transmission frequency, a scramble code, a SYNC code) of a data frame on the basis of the internal time supplied from the internal clock 23 and a terminal ID supplied from a terminal ID memory 22, and supplies to the frame generation unit 25 (step S213 in FIG. 18).

In step S154, the frame generation unit 25 uses the scramble code and the SYNC code in the wireless resource of the control frame supplied from the wireless resource determination unit 24, to generate a control frame containing the wireless resource of the data frame supplied from the wireless resource determination unit 24.

In step S155, a wireless transmission unit 27 transmits the control frame in accordance with the transmission time and the transmission frequency in the wireless resource of the control frame supplied from the wireless resource determination unit 24 (step S214 in FIG. 15).

In step S156, the frame generation unit 25 uses the scramble code and the SYNC code of the data frame supplied from the wireless resource determination unit 24, to generate a data frame containing sensor data.

In step S157, a wireless control unit 26 sets the transmission time in the wireless resource of the data frame supplied from the wireless resource determination unit 24, to a time at which the data frame is transmitted.

In step S158, the wireless transmission unit 27 stands by until it is determined that the time has reached the transmission time (step S215 in FIG. 18).

In a case where it is determined in step S158 that the transmission time has been reached, the process proceeds to step S159.

In step S159, the wireless control unit 26 controls the wireless transmission unit 27 so as to transmit the data frame supplied from the frame generation unit 25 to the wireless transmission unit 27, in accordance with the transmission frequency in the wireless resource of the data frame supplied from the wireless resource determination unit 24. The wireless transmission unit 27 transmits the data frame in accordance with the control of the wireless control unit 26 (step S216 in FIG. 18).

In step S160, the wireless control unit 26 determines whether or not the number of transmissions has reached an upper limit.

In a case where it is determined in step S160 that the number of transmissions has not reached the upper limit, the process returns to step S157, and the subsequent processing is repeated.

In a case where it is determined in step S160 that the number of transmissions has reached the upper limit, the transmission processing is terminated.

Next, the reception processing of the reception device 12 will be described with reference to the flowchart of FIG. 17.

In step S181, a control frame demodulation unit 45 stands by until it is determined that reception of the control frame is successful.

In a case where the control frame demodulation unit 45 determines in step S181 that reception of the control frame is successful, the process proceeds to step S182 (step S231 in FIG. 18). The control frame demodulation unit 45 acquires a terminal ID and a wireless resource contained in DATA from Payload of the control frame, and supplies to a wireless resource calculation unit 51.

A reception time and a reception frequency in the wireless resource are supplied from the wireless resource calculation unit 51 to a wireless control unit 52. A scramble code and a SYNC code in the wireless resource are supplied from the wireless resource calculation unit 51 to a correlator 43-(N+1). The scramble code in the wireless resource is supplied from the wireless resource calculation unit 51 to a data frame demodulation unit 53.

In step S182, the wireless control unit 52 sets the reception time in the wireless resource of the data frame supplied from the wireless resource calculation unit 51, to a time at which the data frame is received.

In step S183, the wireless control unit 52 stands by until it is determined that the time has reached the reception time. In a case where it is determined in step S183 that the reception time has been reached, the process proceeds to step S184 (step S232 in FIG. 18).

A wireless reception unit 41 receives a wireless signal. After a signal of a frequency band supplied from the wireless resource calculation unit 51 to the wireless control unit 52 is taken out by a filter 42-(N+1), and a correlation value is outputted by the correlator 43-(N+1), a time at which the data frame is detected is supplied from a detection unit 44-2 to the data frame demodulation unit 53. On the basis of the time at which the data frame is detected and which is supplied from the detection unit 44-2, the data frame demodulation unit 53 extracts the data frame from a signal supplied from the filter 42-(N+1), and demodulates the extracted data frame.

In step S184, the data frame demodulation unit 53 determines whether or not reception of the data frame is successful.

In a case where the data frame demodulation unit 53 determines in step S184 that reception of the data frame is successful, the process proceeds to step S185 (step S233 in FIG. 18).

In step S185, the data frame demodulation unit 53 acquires sensor data contained in DATA from Payload of the data frame. Thereafter, the reception processing is terminated.

Whereas, in a case where it is determined in step S184 that reception of the data frame is not successful, the process proceeds to step S186.

In step S186, the data frame demodulation unit 53 determines whether or not the number of receptions has reached an upper limit.

In a case where it is determined in step S186 that the number of receptions has not reached the upper limit, the process returns to step S182, and the subsequent processing is repeated.

In a case where it is determined in step S186 that the number of receptions has reached the upper limit, the reception processing is terminated.

As described above, in the wireless communication system of the second embodiment, as transmission-related information, a control frame containing a transmission time and a transmission frequency of a data frame that are determined on the basis of an internal time and a terminal ID is transmitted. Then, after the control frame is transmitted, a data frame containing sensor data as predetermined data is transmitted in accordance with the transmission time and the transmission frequency contained in the control frame.

As a result, it is possible to know, on the reception side, a wireless resource when the data frame is received, so that the standby time can be reduced when the data frame is received.

Furthermore, in the case of the second embodiment, the control frame also contains a scramble code and a SYNC code of the data frame generated from the terminal ID, in addition to the transmission time and the transmission frequency of the data frame. As a result, since it is possible to eliminate, on the reception side, necessity of calculation of the wireless resource of the data frame or omit calculation of the wireless resource, processing on the reception side can be reduced.

3. Third Embodiment (Transmission of Wireless Resource (Other than Code))

In a third embodiment, a control frame contains, as transmission-related information, a transmission time and a transmission frequency in a wireless resource determined on the basis of an internal time and the terminal ID described above in the second embodiment, and contains an initial value at a time of code generation instead of the scrambled code and the SYNC code in the wireless resource.

Since a configuration of a sensor terminal 11 of the third embodiment is basically the same as the configuration of the sensor terminal 11 of FIG. 2, the description thereof will be omitted. Since a configuration of a reception device 12 of the third embodiment is basically the same as the configuration of the reception device 12 of FIG. 10, the description thereof will be omitted.

<Operation of Each Device>

Figure 19:
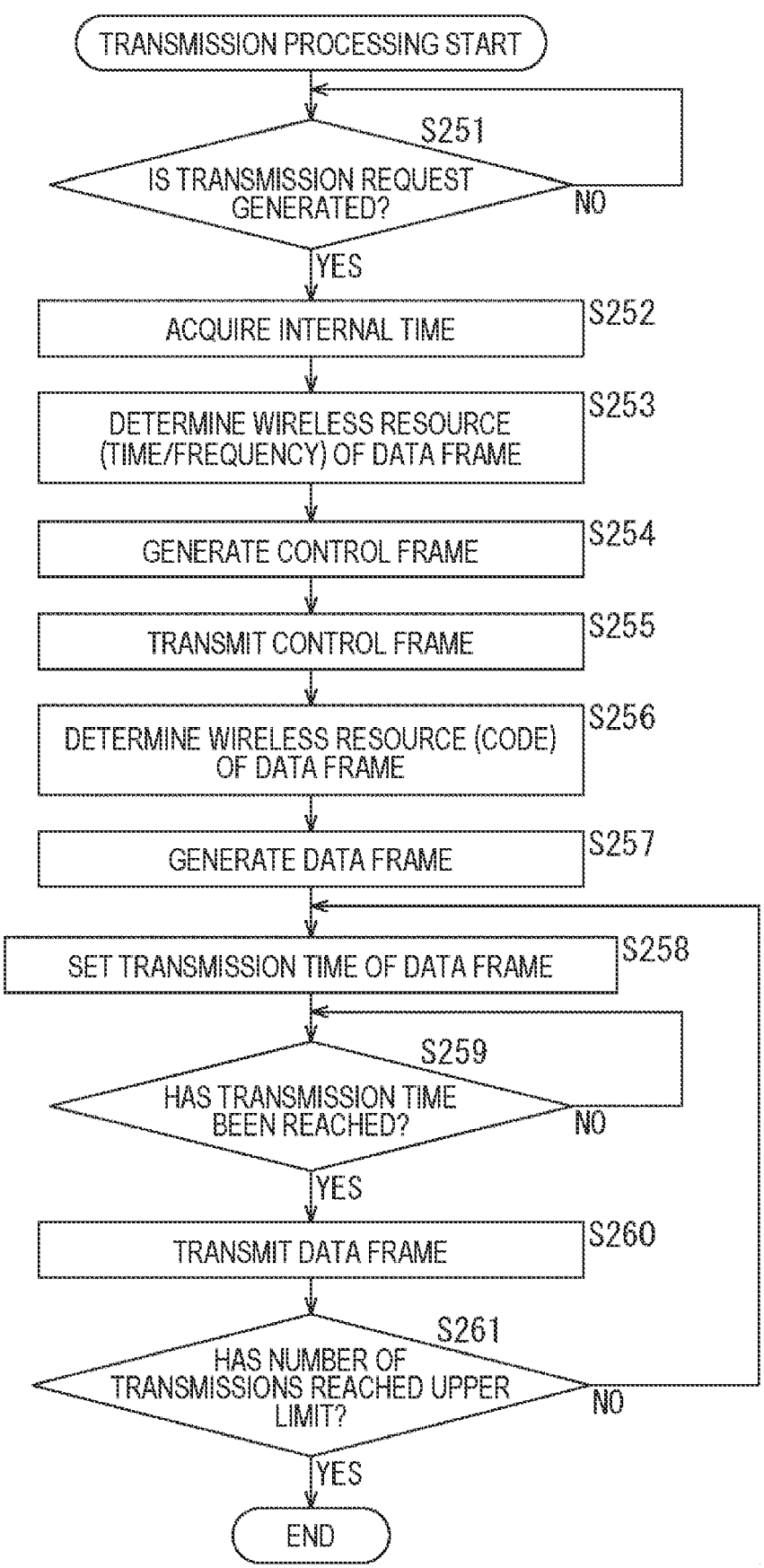
FIG. 19 is a flowchart for explaining transmission processing of a sensor terminal.
Figure 20:
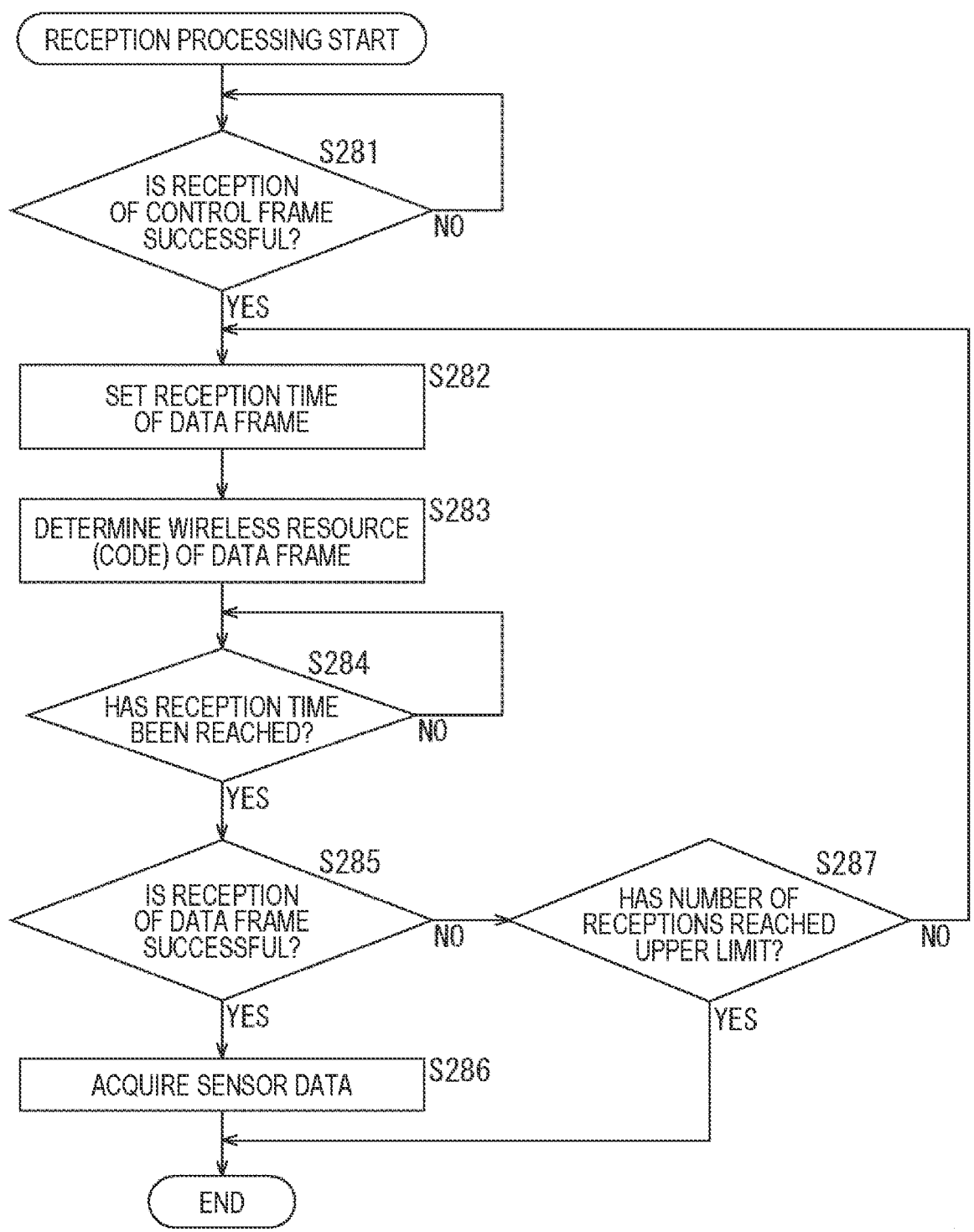
FIG. 20 is a flowchart for explaining reception processing of a reception device.
Figure 21:
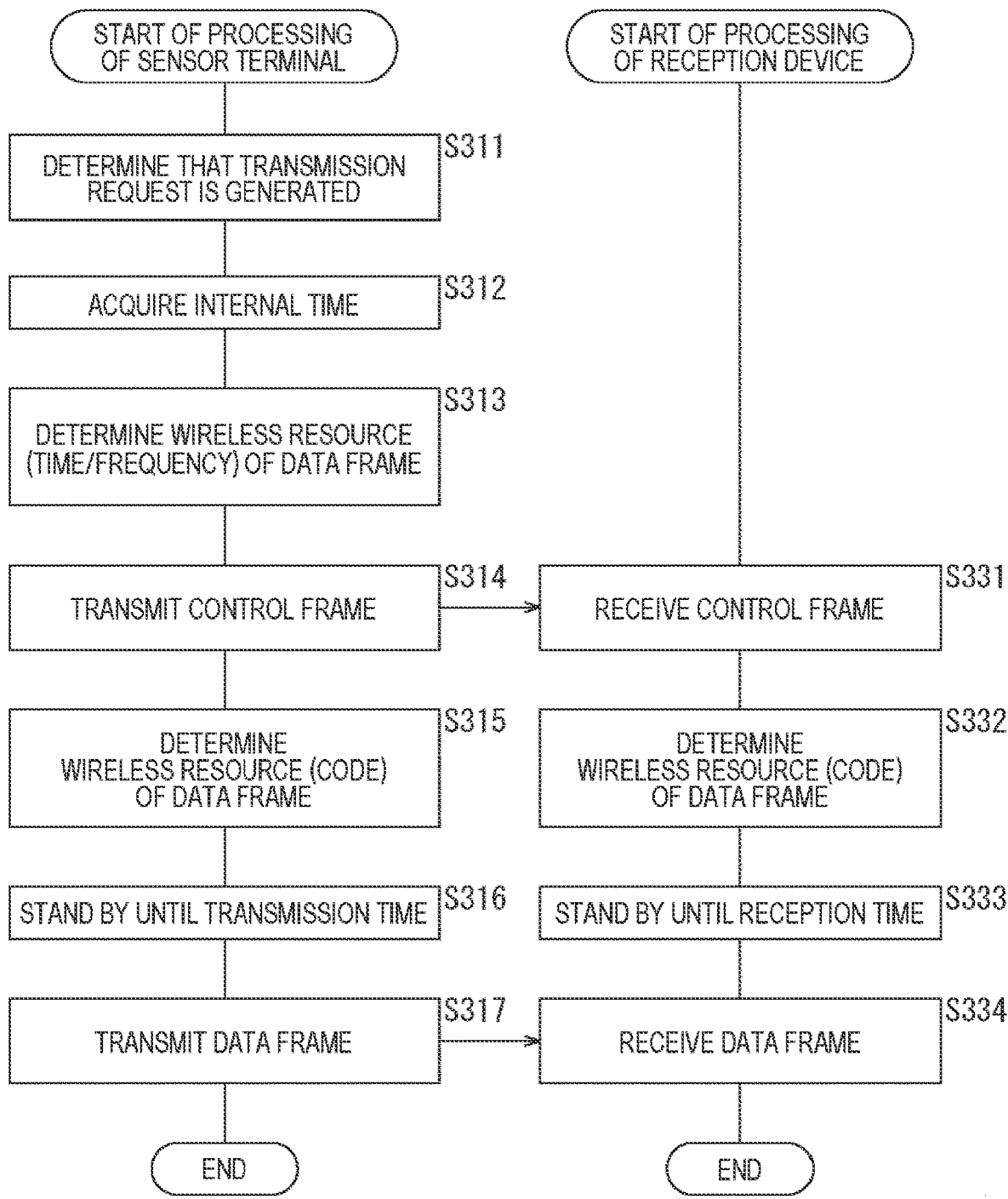
FIG. 21 is a flowchart showing a correspondence between the transmission processing of FIG. 19 and the reception processing of FIG. 20.

FIG. 19 is a flowchart for explaining transmission processing of the sensor terminal 11. FIG. 20 is a flowchart for explaining reception processing of the reception device 12. FIG. 21 is a flowchart showing a correspondence between the transmission processing of FIG. 19 and the reception processing of FIG. 20. Note that, in the description of FIGS. 19 and 20, FIG. 21 is referred to as appropriate.

First, with reference to the flowchart of FIG. 19, the transmission processing of the sensor terminal 11 will be described.

In step S251, a frame generation unit 25 stands by until it is determined that a transmission request is generated. In a case where it is determined in step S251 that a transmission request is generated, the process proceeds to step S252 (step S311 in FIG. 21).

In step S252, a wireless resource determination unit 24 acquires a current internal time supplied from an internal clock 23. The wireless resource determination unit 24 determines, as a transmission time of a control frame, a time obtained by adding a time α required for transmission of the control frame to the acquired current internal time. The wireless resource determination unit 24 also determines other wireless resource (a transmission frequency, a scramble code, a SYNC code) of the control frame (step S312 in FIG. 21).

In step S253, the wireless resource determination unit 24 determines a wireless resource (a transmission time, a transmission frequency) of a data frame on the basis of the internal time supplied from the internal clock 23 and a terminal ID supplied from a terminal ID memory 22, and supplies to the frame generation unit 25 and a wireless control unit 26 (step S313 in FIG. 21).

In step S254, the frame generation unit 25 uses the scramble code and the SYNC code in the wireless resource of the control frame supplied from the wireless resource determination unit 24, to generate a control frame containing the wireless resource (the transmission time, the transmission frequency) of the data frame and an initial value at the time of code generation.

Examples of the initial value at the time of code generation include a terminal ID and a common value of a wireless communication system. In addition to this, the initial value at the time of code generation may be an internal time or another value. Note that, in a case where the initial value at the time of code generation is the terminal ID, it is not necessary to contain it again because it is originally contained in the control frame. Furthermore, in a case where the initial value at the time of code generation is a common value of the wireless communication system, it is not contained in the control frame since it is a known value.

In step S255, a wireless transmission unit 27 transmits the control frame in accordance with the transmission time and the transmission frequency in the wireless resource of the control frame supplied from the wireless resource determination unit 24 (step S314 in FIG. 21).

In step S256, the wireless resource determination unit 24 determines a wireless resource (a scramble code, a SYNC code) of the data frame on the basis of the terminal ID supplied from the terminal ID memory 22, and supplies to the frame generation unit 25 and the wireless control unit 26 (step S315 in FIG. 21).

In step S257, the frame generation unit 25 uses the scramble code and the SYNC code in the wireless resource of the data frame supplied from the wireless resource determination unit 24, to generate a data frame containing sensor data.

In step S258, the wireless control unit 26 sets the transmission time in the wireless resource of the data frame supplied from the wireless resource determination unit 24, to a time at which the data frame is transmitted.

In step S259, the wireless control unit 26 stands by until it is determined that the time has reached the transmission time (step S316 in FIG. 21).

In a case where it is determined in step S259 that the transmission time has been reached, the process proceeds to step S260.

In step S260, in accordance with the transmission frequency in the wireless resource of the data frame supplied from the wireless resource determination unit 24, the wireless control unit 26 controls the wireless transmission unit 27 so as to transmit the data frame supplied from the frame generation unit 25 to the wireless transmission unit 27. The wireless transmission unit 27 transmits the data frame in accordance with the control of the wireless control unit 26 (step S317 in FIG. 21).

In step S261, the wireless control unit 26 determines whether or not the number of transmissions has reached an upper limit.

In a case where it is determined in step S261 that the number of transmissions has not reached the upper limit, the process returns to step S258, and the subsequent processing is repeated.

In a case where it is determined in step S261 that the number of transmissions has reached the upper limit, the transmission processing is terminated.

Next, the reception processing of the reception device 12 will be described with reference to the flowchart of FIG. 20.

In step S281, a control frame demodulation unit 45 stands by until it is determined that reception of the control frame is successful.

In a case where the control frame demodulation unit 45 determines in step S281 that reception of the control frame is successful, the process proceeds to step S282 (step S331 in FIG. 21).

The control frame demodulation unit 45 acquires a terminal ID and a wireless resource (a reception time and a reception frequency) contained in DATA, and supplies to a wireless resource calculation unit 51. In a case where there is an initial value at the time of code generation, the initial value at the time of code generation is also supplied to the wireless resource calculation unit 51. The reception time and the reception frequency are supplied from the wireless resource calculation unit 51 to the wireless control unit 52.

In step S282, the wireless control unit 52 sets the reception time supplied from the wireless resource calculation unit 51, to a time at which the data frame is received.

In step S283, on the basis of the initial value at the time of code generation supplied from the control frame demodulation unit 45, the wireless resource calculation unit 51 determines a wireless resource (a scramble code and a SYNC code) of the data frame (step S332 in FIG. 21). In a case where the initial value at the time of code generation is a terminal ID and a common value of the wireless communication system, the terminal ID and the common value of the wireless communication system are used to determine the wireless resource (the scramble code and the SYNC code) of the data frame.

A scramble code and a SYNC code in the wireless resource of the data frame are outputted from the wireless resource calculation unit 51 to a correlator 43-(N+1). The scramble code in the wireless resource of the data frame is outputted from the wireless resource calculation unit 51 to a data frame demodulation unit 53.

In step S284, the wireless control unit 52 stands by until it is determined that the time has reached the reception time. In a case where it is determined in step S284 that the reception time has been reached, the process proceeds to step S285 (step S333 in FIG. 21).

A wireless reception unit 41 receives a wireless signal. After a signal of a frequency band supplied from the wireless resource calculation unit 51 to the wireless control unit 52 is taken out by a filter 42-(N+1), and a correlation value is outputted by the correlator 43-(N+1), a time at which the data frame is detected is supplied from a detection unit 44-2 to the data frame demodulation unit 53. On the basis of the time at which the data frame is detected and which is supplied from the detection unit 44-2, the data frame demodulation unit 53 extracts the data frame from a signal supplied from the filter 42-(N+1), and demodulates the extracted data frame.

In step S285, the data frame demodulation unit 53 determines whether or not reception of the data frame is successful.

In a case where the data frame demodulation unit 53 determines in step S285 that reception of the data frame is successful, the process proceeds to step S286 (step S334 in FIG. 21).

In step S286, the data frame demodulation unit 53 acquires sensor data contained in DATA from Payload of the data frame. Thereafter, the reception processing is terminated.

Whereas, in a case where it is determined in step S285 that reception of the data frame is not successful, the process proceeds to step S287.

In step S287, the data frame demodulation unit 53 determines whether or not the number of receptions has reached an upper limit.

In a case where it is determined in step S287 that the number of receptions has not reached the upper limit, the process returns to step S282, and the subsequent processing is repeated.

In a case where it is determined in step S287 that the number of receptions has reached the upper limit, the reception processing is terminated.

As described above, in the wireless communication system of the third embodiment, as transmission-related information, a control frame containing a transmission time and a transmission frequency of a data frame that are determined on the basis of an internal time and a terminal ID is transmitted. Then, after the control frame is transmitted, a data frame containing sensor data as predetermined data is transmitted in accordance with the transmission time and the transmission frequency.

As a result, it is possible to know, on the reception side, a wireless resource when the data frame is received, so that the standby time can be reduced when the data frame is received.

Furthermore, in the third embodiment, instead of a code of the wireless resource of the data frame, the control frame contains an initial value at the time of generating the code. That is, the control frame can be shortened by transmitting the initial value of the code, without transmitting the code itself, which has a large amount of data, with the control frame. As a result, it is possible to reduce the transmission power of the sensor terminal 11.

Moreover, in a case where one of the initial values at the time of generating the code is a terminal ID, it is not necessary to contain the terminal ID again because it is originally contained in the control frame. In a case where another one of the initial values at the time of generating the code is a common value of the wireless communication system, it is not necessary to contain the common value of the wireless communication system since it is a value known on the reception side. Therefore, since the control frame can be further shortened, the transmission power of the sensor terminal 11 can be reduced.

4. Fourth Embodiment (Transmission of Plurality of Data Frames)

In a fourth embodiment, different data frames are transmitted a plurality of times for one-time transmission of a control frame.

Since a configuration of a sensor terminal 11 of the fourth embodiment is basically the same as the configuration of the sensor terminal 11 of FIG. 2, the description thereof will be omitted. Since a configuration of a reception device 12 of the fourth embodiment is basically the same as the configuration of the reception device 12 of FIG. 10, the description thereof will be omitted.

Figure 22:
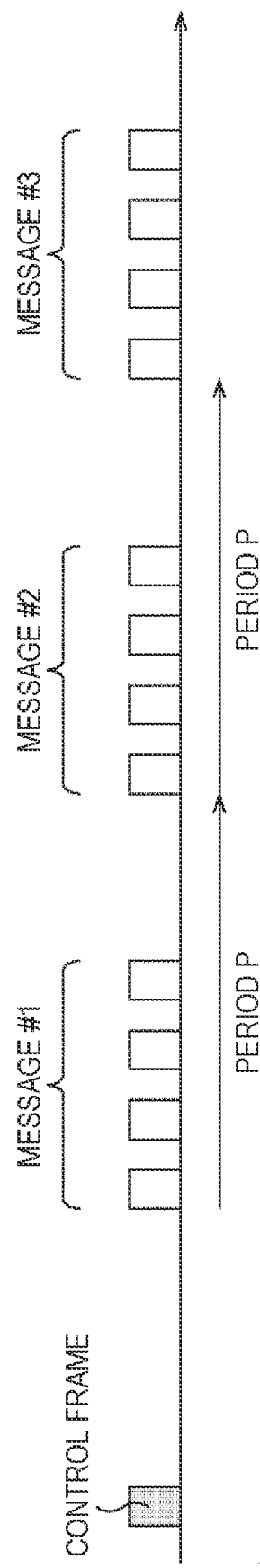
FIG. 22 is a view showing an example in which different data frames are transmitted a plurality of times for one-time transmission of a control frame.

FIG. 22 is a view showing an example in which different data frames are transmitted a plurality of times for one-time transmission of a control frame.

In the example of FIG. 22, an example is shown in which transmission of a data frame of four times is performed M (M=3) times with a period P, for one-time transmission of a control frame. Hereinafter, the data frame of the four times will be referred to as a message. Note that the data frames of different messages contain the same different sensor data.

After the control frame is transmitted, as shown in FIG. 22, the first message #1, the second message #2, and the third message #3 are transmitted every period P.

A wireless resource of message #1 is determined similarly to that in any of the first to third embodiments described above. A wireless resource of message #2 is determined as follows.

In a case of a transmission time, the period P is added to an SP number of SP in which the message #1 is transmitted and which is determined by the above Equation (4). A transmission time of message #2 is calculated by the following Equation (9).

[Formula 9]

$$T_{sp\_tx} = SP \cdot \text{floor}\left(\frac{t}{SP}\right) + SP \cdot \left(1 + \text{mod}\left(\frac{ID}{N}\right)\right) + P \quad (9)$$

The transmission time of the data frame in the TS is determined by the method described in the first embodiment, by using a time and a terminal ID determined by Equation (9) as initial values of pseudo-random number generators represented by the generation polynomials of Equations (5) and (6).

A transmission frequency of message #2 is determined by a method similar to the method using Equation (8). However, in a case of the message #2, it is different from the case of message #1 in that a value obtained by adding the period P to the transmission time of the control frame and the terminal ID are used as initial values of the pseudo-random number generators represented by the generation polynomials of Equations (5) and (6).

Furthermore, a transmission time and a transmission frequency in a case of message #3 are determined by doubling and adding the value of the period P added in the message #2. That is, the transmission time and the transmission frequency increase the number of the period P to be added, in accordance with the number of times the message is repeatedly transmitted.

Note that a scramble code and a SYNC code are determined by using the terminal ID, similarly to the first embodiment.

Furthermore, the period P and the number of transmissions M can be treated as known values on the transmission side and the reception side, by determining for the terminal ID in advance. Moreover, the transmission side may determine the period P and the number of transmissions M, include them in the DATA of the control frame, and transmit them to the reception side.

<Operation of each Device>

Figure 23:
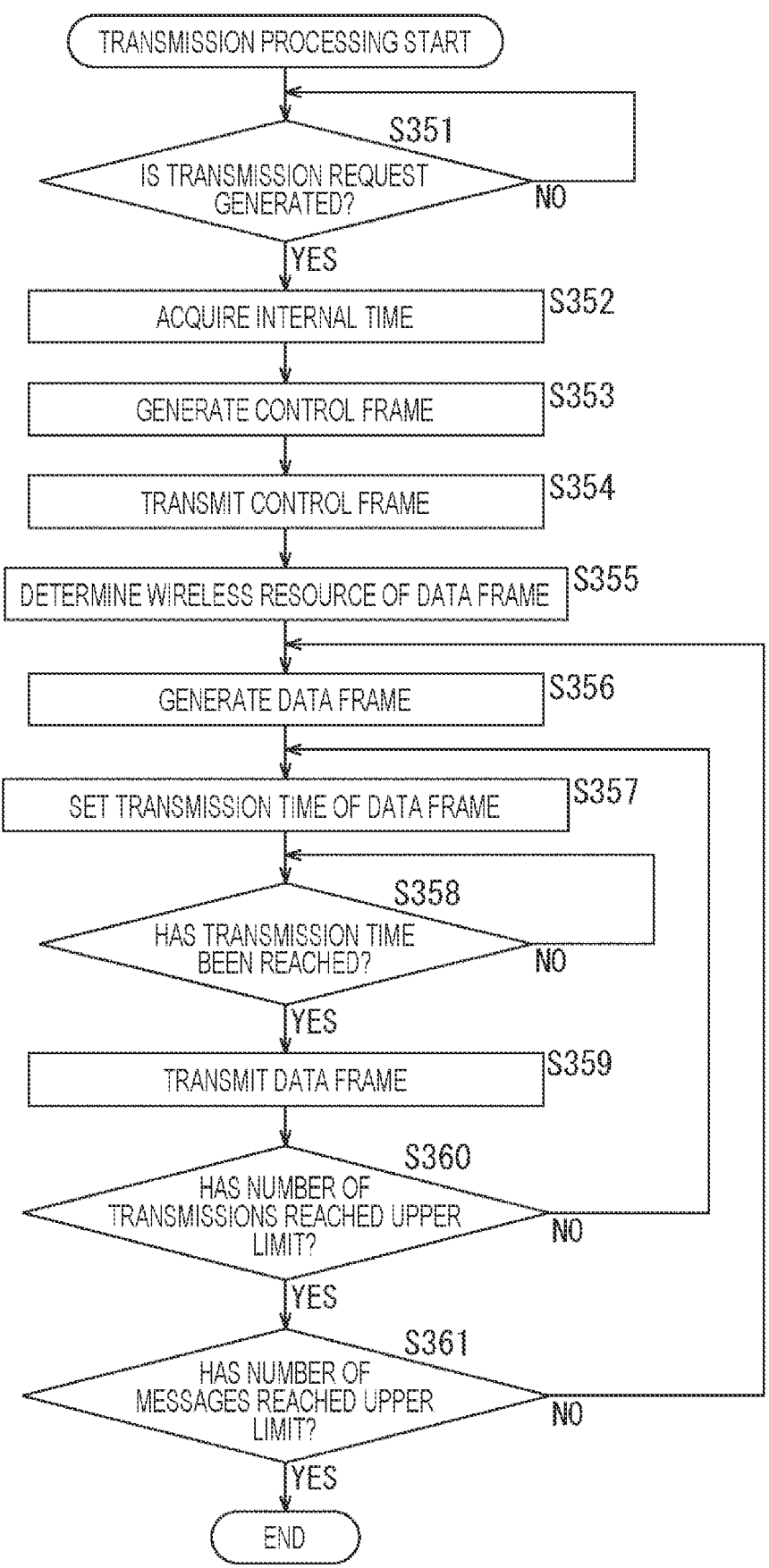
FIG. 23 is a flowchart for explaining transmission processing of a sensor terminal.
Figure 24:
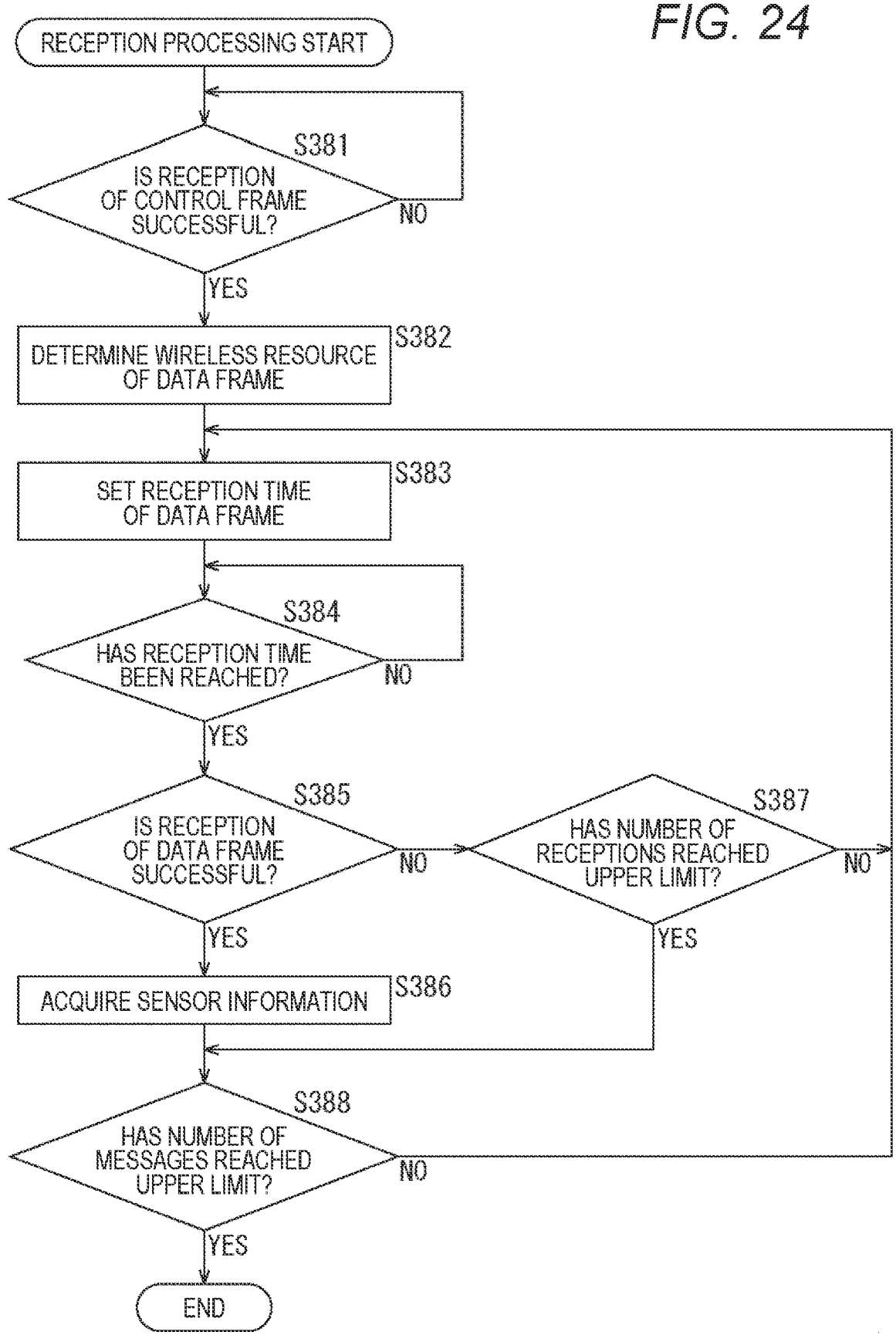
FIG. 24 is a flowchart for explaining reception processing of a reception device.
Figure 25:
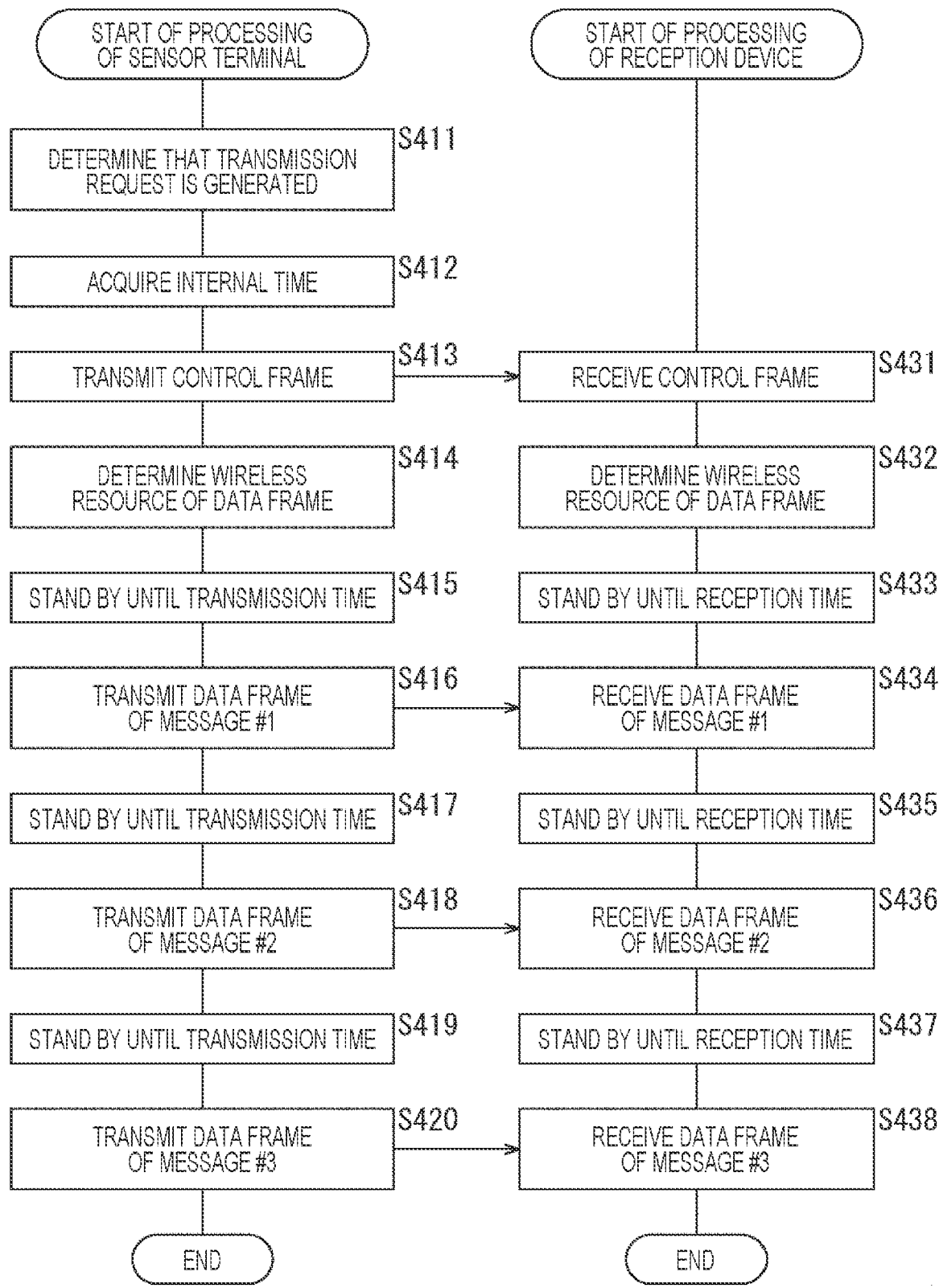
FIG. 25 is a flowchart showing a correspondence between the transmission processing of FIG. 23 and the reception processing of FIG. 24.

FIG. 23 is a flowchart for explaining transmission processing of the sensor terminal 11. FIG. 24 is a flowchart for explaining reception processing of the reception device 12. FIG. 25 is a flowchart showing a correspondence between the transmission processing of FIG. 23 and the reception processing of FIG. 24. Note that, in the description of FIGS. 23 and 24, FIG. 25 is referred to as appropriate.

First, with reference to the flowchart of FIG. 23, the transmission processing of the sensor terminal 11 will be described.

In step S351, a frame generation unit 25 stands by until it is determined that a transmission request is generated. In a case where it is determined in step S351 that a transmission request is generated, the process proceeds to step S352 (step S411 in FIG. 25).

In step S352, a wireless resource determination unit 24 acquires a current internal time supplied from an internal clock 23. The wireless resource determination unit 24 determines, as a transmission time of a control frame, a time obtained by adding a time α required for transmitting the control frame to the acquired current internal time. The wireless resource determination unit 24 also determines other wireless resource (a transmission frequency, a scramble code, a SYNC code) of the control frame, and supplies to the frame generation unit 25 and a wireless control unit 26 (step S412 in FIG. 25).

In step S353, the frame generation unit 25 uses the scramble code and the SYNC code in the wireless resource of the control frame supplied from the wireless resource determination unit 24, to generate a control frame. The control frame contains the internal time supplied from the internal clock 23 and a terminal ID supplied from the terminal ID memory 22. The control frame is supplied from the frame generation unit 25 to the wireless transmission unit 27.

In step S354, in accordance with the transmission time and the transmission frequency in the wireless resource of the control frame supplied from the wireless resource determination unit 24, a wireless transmission unit 27 transmits the control frame supplied from the frame generation unit 25 (step S413 in FIG. 25).

In step S355, on the basis of the internal time contained in the control frame and the terminal ID supplied from the terminal ID memory 22, the wireless resource determination unit 24 determines a wireless resource (a transmission time, a transmission frequency, a scramble code, a SYNC code) of a data frame and supplies to the frame generation unit 25 and the wireless control unit 26 (step S414 in FIG. 25).

In step S356, in accordance with the internal time supplied from the internal clock 23 and the terminal ID supplied from the terminal ID memory 22, the frame generation unit 25 uses the scrambled code and the SYNC code in the wireless resource of the data frame to generate a data frame containing sensor data. Note that, every generation of a frame, the data frame contains different sensor data.

In step S357, the wireless control unit 26 sets the transmission time in the wireless resource of the data frame supplied from the wireless resource determination unit 24, to a time at which the data frame is transmitted.

In step S358, the wireless control unit 26 stands by until it is determined that the time has reached the transmission time (steps S415, S417, S419 in FIG. 5).

In a case where it is determined in step S358 that the transmission time has been reached, the process proceeds to step S359.

In step S359, in accordance with the transmission frequency in the wireless resource of the data frame supplied from the wireless resource determination unit 24, the wireless control unit 26 controls the wireless transmission unit 27 so as to transmit a data frame of a message #n (n=1 to 3) supplied from the frame generation unit 25 to the wireless transmission unit 27. The wireless transmission unit 27 transmits the data frame in accordance with the control of the wireless control unit 26 (steps S416, S418, S420 in FIG. 25).

In step S360, the wireless control unit 26 determines whether or not the number of transmissions has reached an upper limit.

In a case where it is determined in step S360 that the number of transmissions has not reached the upper limit, the process returns to step S357, and the subsequent processing is repeated.

In a case where it is determined in step S360 that the number of transmissions has reached the upper limit, the process proceeds to step S361.

In step S361, the wireless control unit 26 determines whether or not the number of messages has reached the upper limit (for example, three times). In a case where it is determined in step S361 that the number of messages has not reached the upper limit, the process returns to step S356, and the subsequent processing is repeated.

In a case where it is determined in step S361 that the number of messages has reached the upper limit, the transmission processing is terminated.

Next, the reception processing of the reception device 12 will be described with reference to the flowchart of FIG. 24.

In step S381, a control frame demodulation unit 45 stands by until it is determined that reception of the control frame is successful.

In a case where the control frame demodulation unit 45 determines in step S381 that reception of the control frame is successful, the process proceeds to step S382 (step S431 in FIG. 25). The control frame demodulation unit 45 acquires a terminal ID and an internal time contained in DATA from Payload of the control frame, and outputs to a wireless resource calculation unit 51.

In step S382, the wireless resource calculation unit 51 determines a wireless resource of a data frame in accordance with the terminal ID and the internal time supplied from the control frame demodulation unit 45, and supplies to a wireless control unit 52 and a data frame demodulation unit 53 (step S432 in FIG. 25).

In step S383, the wireless control unit 52 sets the reception time in the wireless resource of the data frame supplied from the wireless resource calculation unit 51, to a time at which the data frame is received.

In step S384, the wireless control unit 52 stands by until it is determined that the time has reached the reception time. In a case where it is determined in step S384 that the reception time has been reached, the process proceeds to step S385 (steps S433, S435, S437 in FIG. 25).

A wireless reception unit 41 receives a wireless signal. After a signal of a frequency band supplied from the wireless resource calculation unit 51 to the wireless control unit 52 is taken out by a filter 42-(N+1), and a correlation value is outputted by a correlator 43-(N+1), a time at which the data frame is detected is supplied from a detection unit 44-2 to the data frame demodulation unit 53. On the basis of the time at which the data frame is detected and which is supplied from the detection unit 44-2, the data frame demodulation unit 53 extracts the data frame from a signal supplied from the filter 42-(N+1), and demodulates the extracted data frame.

In step S385, the data frame demodulation unit 53 determines whether or not reception of the data frame of the message #n (n=1 to 3) is successful.

In a case where the data frame demodulation unit 53 determines in step S385 that reception of the data frame is successful, the process proceeds to step S386 (steps S434, S436, S438 in FIG. 25).

In step S386, the data frame demodulation unit 53 acquires sensor data contained in DATA of the data frame from Payload. Thereafter, the process proceeds to step S388.

Whereas, in a case where it is determined in step S385 that reception of the data frame is not successful, the process proceeds to step S387.

In step S387, the data frame demodulation unit 53 determines whether or not the number of receptions has reached an upper limit.

In a case where it is determined in step S387 that the number of receptions has not reached the upper limit, the process returns to step S383, and the subsequent processing is repeated.

In a case where it is determined in step S387 that the number of receptions has reached the upper limit, the process proceeds to step S388.

In step S388, the data frame demodulation unit 53 determines whether or not the number of messages has reached an upper limit. In a case where it is determined in step S388 that the number of messages has not reached the upper limit, the process returns to step S383, and the subsequent processing is repeated.

In a case where it is determined in step S388 that the number of messages has reached the upper limit, the reception processing is terminated.

As described above, in the wireless communication system of the fourth embodiment, after one-time transmission of a control frame, individually different data frames are transmitted a plurality of times.

As a result, the frequency of transmission of the control frame can be reduced, which can contribute to reduction of power consumption of the sensor terminal.

Note that the technology of the fourth embodiment described above can be used in combination with the technology of the first to third embodiments.

As described above, in the present technology, a control frame is transmitted containing transmission-related information regarding a transmission time and a transmission frequency that are determined on the basis of an internal time and a terminal ID on a transmission side. Then, after the control frame is transmitted, a data frame containing sensor data as predetermined data is transmitted in accordance with the transmission-related information contained in the control frame.

Therefore, according to the present technology, it is possible to provide a low power consumption wireless communication system that can be used even in a place where GPS signals cannot be received.

Furthermore, a low power consumption wireless communication system can be provided at a low cost.

Moreover, processing on the reception side can be reduced.

Note that, in the wireless communication system described above, a description has been given to an example in which the terminal on the transmission side is a sensor terminal, but the present technology can also be applied to a terminal that does not have a sensor.

5. Fifth Embodiment (Computer)

<Configuration Example of Computer>

The series of processes described above can be executed by hardware or software. In a case of executing the series of processes by software, a program that forms the software is installed from a program recording medium to a computer incorporated in dedicated hardware, to a general-purpose personal computer, or the like.

FIG. 26 is a block diagram showing a configuration example of hardware of a computer that executes the series of processes described above in accordance with a program.

A central processing unit (CPU) 301, a read only memory (ROM) 302, and a random access memory (RAM) 303 are mutually connected by a bus 304.

The bus 304 is further connected with an input/output interface 305. The input/output interface 305 is connected with an input unit 306 including a keyboard, a mouse, and the like, and an output unit 307 including a display device, a speaker, and the like. Furthermore, the input/output interface 305 is connected with a storage unit 308 including a hard disk, a non-volatile memory, and the like, a communication unit 309 including a network interface and the like, and a drive 310 that drives a removable medium 311.

In the computer configured as described above, the series of processes described above are performed, for example, by the CPU 301 loading a program recorded in the storage unit 308 into the RAM 303 via the input/output interface 305 and the bus 304, and executing.

The program to be executed by the CPU 301 is provided, for example, by being recorded on the removable medium 311 or via wired or wireless transfer media such as a local area network, the Internet, and digital broadcasting, to be installed in the storage unit 308.

Note that the program executed by the computer may be a program that performs processing in a time sequence according to an order described in this specification, or may be a program that performs processing in parallel or at necessary timing such as when a call is made.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Note that, the effects described in this specification are merely examples and are not limited, and other effects may also be present.

The embodiments of the present technology are not limited to the above-described embodiments, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can have the following configurations.

(1) A transmission device including:
  a transmission unit configured to transmit a data frame containing predetermined data in accordance with a transmission time and a transmission frequency, after transmitting a control frame containing transmission-related information regarding the transmission time and the transmission frequency that are determined on the basis of an internal time and a terminal ID on a transmission side.

(2) The transmission device according to (1) above, further including:

a frame generation unit configured to generate the control frame and generate the data frame by using a predetermined code determined on the basis of the terminal ID.
(3) The transmission device according to (2) above, in which
the frame generation unit generates the control frame containing the internal time and the terminal ID.
(4) The transmission device according to (2) above, in which
the frame generation unit generates the control frame containing the transmission time and the transmission frequency.
(5) The transmission device according to (4) above, in which
the frame generation unit generates the control frame containing the predetermined code.
(6) The transmission device according to (4) above, in which
the frame generation unit generates the control frame containing the terminal ID as an initial value at a time of determining the predetermined code.
(7) The transmission device according to any one of (1) to (6) above, in which
the transmission unit transmits a plurality of the data frames that is different, after transmitting the control frame.
(8) A transmission method including:
by a transmission device,
transmitting a data frame containing predetermined data in accordance with a transmission time and a transmission frequency, after transmitting a control frame containing transmission-related information regarding the transmission time and the transmission frequency that are determined on the basis of an internal time and a terminal ID on a transmission side.
(9) A reception device including:
a demodulation unit configured to demodulate a data frame containing predetermined data in accordance with a transmission time and a transmission frequency, after reception of a control frame containing transmission-related information regarding the transmission time and the transmission frequency that are determined on the basis of an internal time and a terminal ID on a transmission side.
(10) The reception device according to (9) above, in which
the demodulation unit demodulates the data frame in accordance with a predetermined code determined on the basis of the terminal ID.
(11) The reception device according to (10), in which the control frame contains the internal time and the terminal ID, and
the demodulation unit demodulates the data frame in accordance with the transmission time and the transmission frequency that are determined on the basis of the internal time and the terminal ID that are contained in the control frame.
(12) The reception device according to (10) above, in which
the control frame contains the transmission time and the transmission frequency, and
the demodulation unit demodulates the data frame in accordance with the transmission time and the transmission frequency that are contained in the control frame.
(13) The reception device according to (12) above, in which
the control frame contains the predetermined code, and
the demodulation unit demodulates the data frame by using the predetermined code contained in the control frame.
(14) The reception device according to (12) above, in which
the control frame contains the terminal ID as an initial value at a time of determining the predetermined code, and
the demodulation unit demodulates the data frame by using the predetermined signal determined with the terminal ID contained in the control frame as an initial value.
(15) The reception device according to any one of (9) to (14) above, in which
the demodulation unit demodulates a plurality of the data frames that is different and transmitted after the control frame is received.
(16) A reception method including:
by a reception device,
demodulating a data frame containing predetermined data in accordance with a transmission time and a transmission frequency, after reception of a control frame containing transmission-related information regarding the transmission time and the transmission frequency that are determined on the basis of an internal time and a terminal ID on a transmission side.

REFERENCE SIGNS LIST

11 Sensor terminal
12 Reception device
21 Sensor data acquisition unit
22 Terminal ID memory
23 Internal clock
24 Wireless resource determination unit
25 Frame generation unit
26 Wireless control unit
27 Wireless transmission unit
41 Wireless reception unit
42, 42-1 to 42-N, 42-(N+1) Filter
43, 43-1 to 43-N, 43-(N+1) Correlator
44-1, 44-2 Detection unit
45 Control frame demodulation unit
46 Demodulation unit
51 Wireless resource calculation unit
52 Wireless control unit
53 Data frame demodulation unit

The invention claimed is:
1. A transmission device, comprising:
circuitry configured to:
transmit control frame that contains transmission-related information based on a transmission time and a transmission frequency, wherein the transmission time and the transmission frequency are determined based on an internal time and a terminal ID on a transmission side; and
transmit, based on the transmission of the control frame, a data frame that contains specific data based on the transmission time and the transmission frequency.

2. The transmission device according to claim 1, wherein the circuitry is further configured to
generate the control frame; and
generate the data frame based on a specific code, wherein the specific code is based on the terminal ID.

3. The transmission device according to claim 2, wherein the circuitry is further configured to generate the control frame that contains the internal time and the terminal ID.

4. The transmission device according to claim 2, wherein the circuitry is further configured to generate the control frame that contains the transmission time and the transmission frequency.

5. The transmission device according to claim 4, wherein the circuitry is further configured to generate the control frame that contains the specific code.

6. The transmission device according to claim 4, wherein the circuitry is further configured to generate the control frame that contains the terminal ID as an initial value at a time of determination of the specific code.

7. The transmission device according to claim 2, wherein the circuitry is further configured to transmit a plurality of different data frames based on the transmission of the control frame.

8. A transmission method, comprising:
in a transmission device:
transmitting a control frame containing transmission-related information based on a transmission time and a transmission frequency, wherein the transmission time and the transmission frequency are determined based on an internal time and a terminal ID on a transmission side; and
transmitting, based on the transmission of the control frame, a data frame containing specific data based on the transmission time and the transmission frequency.

9. A reception device, comprising:
circuitry configured to:
receive a control frame that contains transmission-related information based on a transmission time and a transmission frequency, wherein the transmission time and the transmission frequency are based on an internal time and a terminal ID on a transmission side; and
demodulate, based on the reception of the control frame, a data frame that contains specific data based on the transmission time and the transmission frequency.

10. The reception device according to claim 9, wherein the circuitry is further configured to demodulate the data frame based on a specific code, and
the specific code is based on the terminal ID.

11. The reception device according to claim 10, wherein the control frame further contains the internal time and the terminal ID,
the circuitry is further configured to demodulate the data frame based on the transmission time and the transmission frequency, and
the transmission time and the transmission frequency are based on the internal time and the terminal ID.

12. The reception device according to claim 10, wherein the control frame further contains the transmission time and the transmission frequency, and
the circuitry is further configured to demodulate the data frame based on the transmission time and the transmission frequency.

13. The reception device according to claim 12, wherein the control frame further contains the specific code, and
the circuitry is further configured to demodulate the data frame based on the specific code.

14. The reception device according to claim 12, wherein the control frame further contains the terminal ID as an initial value based on a time of determination of the specific code,
the circuitry is further configured to demodulate the data frame based on the specific code.

15. The reception device according to claim 10, wherein the circuitry is further configured to demodulate a plurality of different data frames transmitted based on the reception of the control frame.

16. A reception method, comprising:
in a reception device:
receiving a control frame containing transmission-related information based on a transmission time and a transmission frequency, wherein the transmission time and the transmission frequency are based on an internal time and a terminal ID on a transmission side; and
demodulating, based on the reception of the control frame, a data frame containing specific data based on the transmission time and the transmission frequency.

* * * * *